(12) United States Patent
Nishiyama

(10) Patent No.: US 7,602,993 B2
(45) Date of Patent: Oct. 13, 2009

(54) IMAGE PROCESSING AND DISPLAY USING A PLURALITY OF USER MOVABLE VIEWER AREAS

(75) Inventor: Hiroto Nishiyama, Hino (JP)

(73) Assignee: Olympus Corporation, Tokyo (JP)

( * ) Notice: Subject to any disclaimer, the term of this patent is extended or adjusted under 35 U.S.C. 154(b) by 687 days.

(21) Appl. No.: 11/149,467

(22) Filed: Jun. 9, 2005

(65) Prior Publication Data

US 2005/0281482 A1 Dec. 22, 2005

(30) Foreign Application Priority Data

Jun. 17, 2004 (JP) ............................. 2004-179569
Jul. 15, 2004 (JP) ............................. 2004-208924

(51) Int. Cl.
*G06K 9/20* (2006.01)
*G06K 9/36* (2006.01)

(52) U.S. Cl. .................................... 382/282

(58) Field of Classification Search ................ 382/282, 382/283, 307, 309, 311; 345/619
See application file for complete search history.

(56) References Cited

U.S. PATENT DOCUMENTS 5,425,137 A * 6/1995 Mohan et al. ................ 345/619

FOREIGN PATENT DOCUMENTS

| JP | 07-219948 | 8/1995 |
|---|---|---|
| JP | 08-123940 | 5/1996 |
| JP | 09-016799 | 1/1997 |
| JP | 2002-152496 | 5/2002 |
| JP | 2004-56488 | 2/2004 |

OTHER PUBLICATIONS

Notice of Reasons for Rejection for Japanese Patent Application No. 2004-208924, mailed Apr. 21, 2009 (3 pgs.) with translation (4 pgs.).
Final Notice of Rejection for Japanese Patent Application No. 2004-208924, mailed Jun. 30, 2009 (2 pgs.) with translation (3 pgs.).

* cited by examiner

*Primary Examiner*—Brian Q Le
(74) *Attorney, Agent, or Firm*—Straub and Pokotylo; John C. Pokotylo

(57) ABSTRACT

The image processing method includes specifying an original image to be processed, displaying the specified original image, dividing the image into a plurality of movable or transformable areas, selecting one of the divided areas, specifying image processing to be performed on the selected area, creating a processed image obtained by subjecting the display image to the specified image processing, replacing the selected area with the area corresponding to the processed image, moving or transforming the selected area, and updating the display image in such a manner that the result of the image processing is displayed in the area according to the movement or transformation of the area and that the image before the image processing is displayed in the remaining area of the display image.

33 Claims, 22 Drawing Sheets

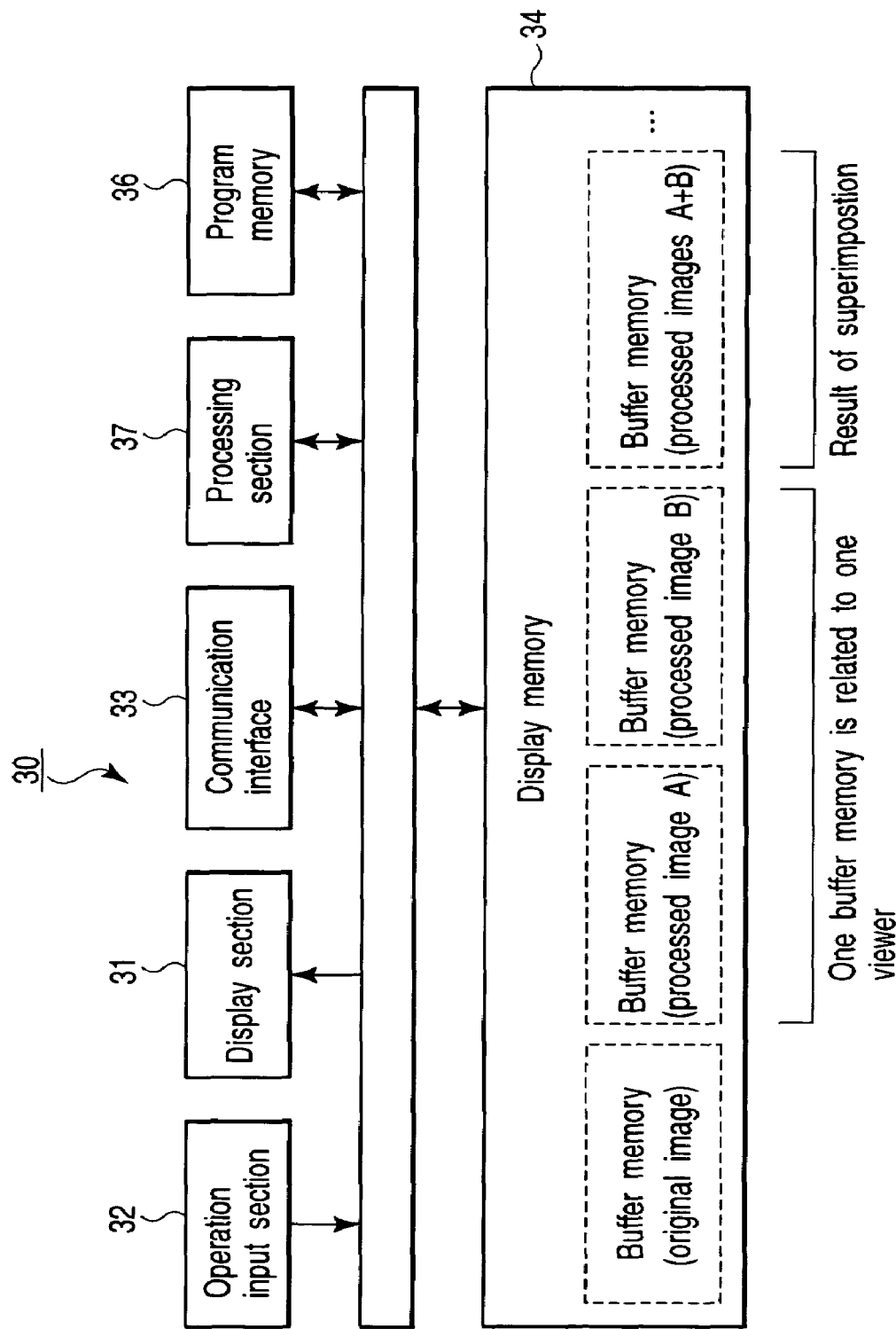
F I G. 3

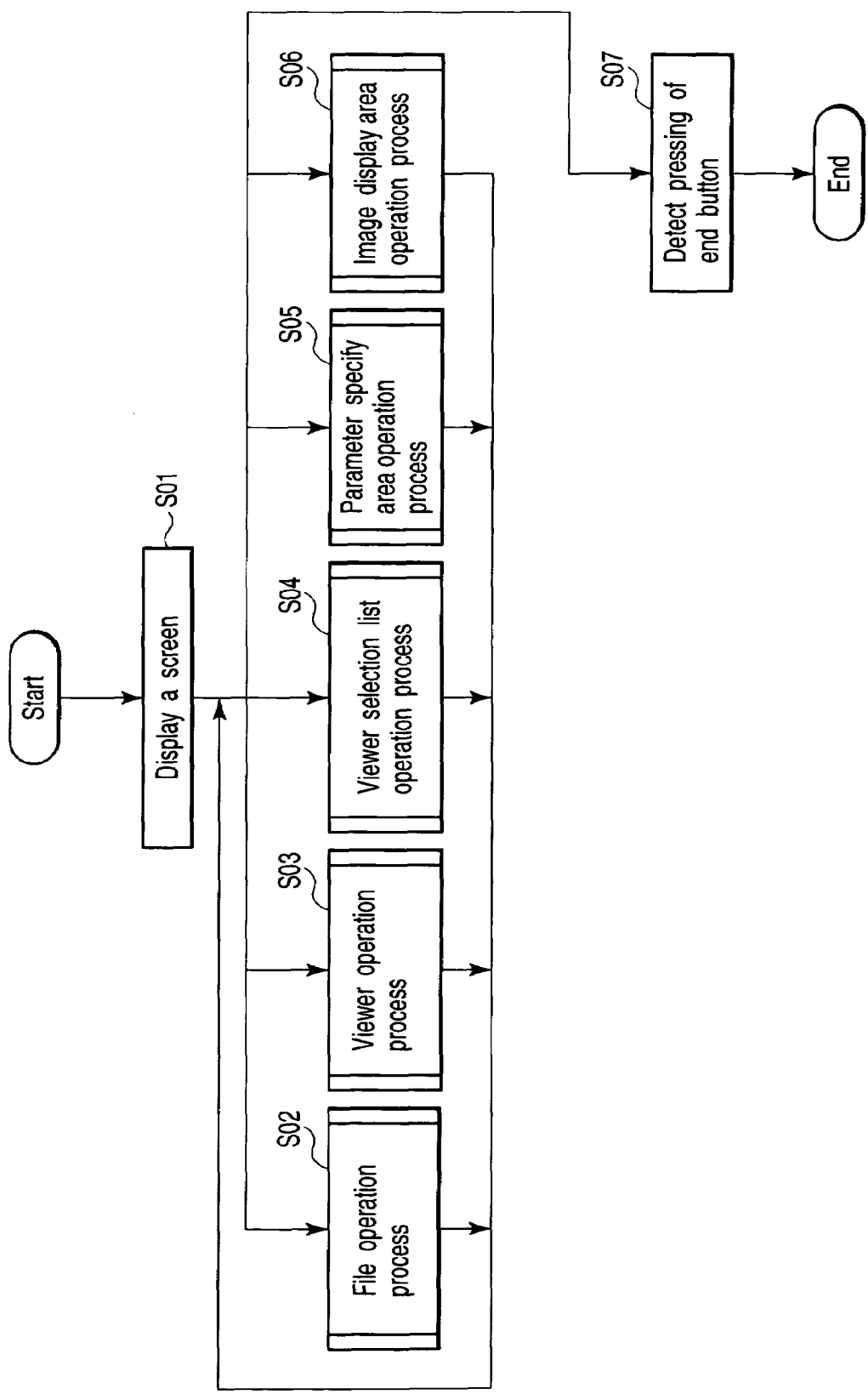
F I G. 5

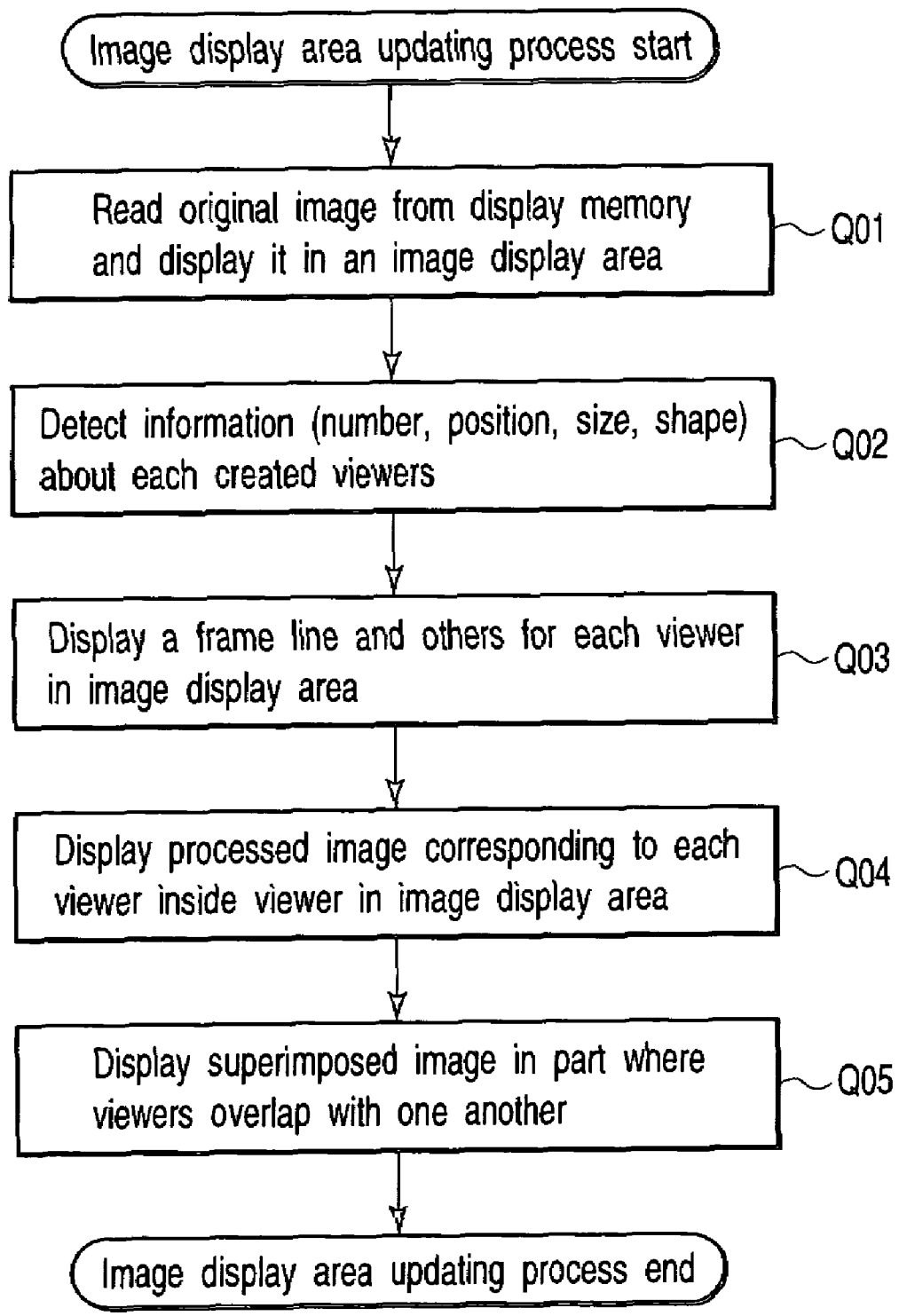
F I G. 8

IMAGE PROCESSING AND DISPLAY USING A PLURALITY OF USER MOVABLE VIEWER AREAS

CROSS-REFERENCE TO RELATED APPLICATIONS

This application is based upon and claims the benefit of priority from prior Japanese Patent Applications No. 2004-179569, filed Jun. 17, 2004; and No. 2004-208924, filed Jul. 15, 2004, the entire contents of both of which are incorporated herein by reference.

BACKGROUND OF THE INVENTION

1. Field of the Invention

This invention relates to image processing technology, and more particularly to the technique for performing image processing efficiently and enabling its result to be checked easily.

2. Description of the Related Art

To subject images to image processing, including brightness and color adjustments, the following adjusting method has been generally used. The user displays the whole of or the main part of an image to be processed on the display. Looking at the image, the user operates the adjusting slider and dial with the mouse or the like, thereby adjusting such parameters as brightness and color so as to obtain a desired image.

With this method, however, the user can observe only the image corresponding to the parameter being adjusted. Since there is no object to be compared with the image, it is very difficult to determine whether the image has been adjusted to the desired one. Therefore, the user cannot adjust the image to a satisfactory one swiftly unless the user accumulates a certain amount of experience.

The function of preparing an image obtained by reducing the original image and displaying the image before processing and the image after the parameters have been adjusted variously side by side on the same screen has been included particularly in entry-level image processing software. In this method, a plurality of images displayed can be compared with one another at a glance. Therefore, the method is suitable to grasp how the adjustments have been made, but is unsuitable for detailed adjustment because the images are small.

A method of displaying the image in an area of the original image so as to highlight the image while leaving the images in the other areas unchanged has been disclosed (Jpn. Pat. Appln. KOKAI Publication No. 2002-152496). Use of this method enables the original image to be compared with the processed image on one screen.

BRIEF SUMMARY OF THE INVENTION

According to a first aspect of the present invention, there is provided an image processing method used in an image processing apparatus which includes processing means for processing an image and a display for displaying an image, the image processing method comprising: specifying an original image to be processed; displaying a display image of the specified original image on the display; dividing the display image displayed on the display into a plurality of movable or transformable areas; selecting one of the divided areas of the display image; specifying image processing to be performed on the selected area of the display image; creating a processed image obtained by subjecting the display image to the specified image processing; replacing the selected area of the display image with the area corresponding to the processed image subjected to the image processing; moving or transforming the selected area; and updating the display image in such a manner that the result of the image processing is displayed in the area according to the movement or transformation of the area and that the image before the image processing is displayed in the remaining area of the display image.

According to a second aspect of the present invention, there is provided an image processing apparatus comprising: a display which displays an image; an image specifying section which specifies an original image to be processed; an image display section which displays on the display a display image of the original image specified by the image specifying section; an image dividing section which divides the display image displayed by the image display section into a plurality of movable or transformable areas; an area selecting section which selects one of the areas of the display image divided by the image dividing section; an image processing specifying section which specifies image processing to be performed on the area of the display image selected by the area selecting section; an image processing section which creates a processed image obtained by subjecting the display image to image processing specified by the image processing specifying section; a display updating section which replaces the selected area of the display image with the area corresponding to the image subjected to image processing at the image processing section; and an area moving and transforming section which moves or transforms the area selected by the area selecting section, wherein the display updating section updates the display image in such a manner that the result of the image processing is displayed in the area according to the movement or transformation of the area and that the image before being subjected to image processing at the image processing section is displayed in the remaining area of the display image.

According to a third aspect of the present invention, there is provided an image processing program executed on an image processing apparatus which includes processing means for processing an image and a display for displaying an image, the image processing program comprising: an image specifying step of specifying an original image to be processed; an image displaying step of displaying on the display a display image of the original image specified in the image specifying step; an image dividing step of dividing the display image displayed in the image displaying step into a plurality of movable or transformable areas; an area selecting step of selecting one of the areas of the display image divided in the image dividing step; an image processing specifying step of specifying image processing to be performed on the area of the display image selected in the area selecting step; an image processing step of creating a processed image obtained by subjecting the display image to image processing specified in the image processing specifying step; a display updating step of replacing the selected area of the display image with the area corresponding to the image subjected to image processing in the image processing step; and an area moving and transforming step of moving or transforming the area selected in the area selecting step, wherein the display updating step is to update the display image in such a manner that the result of the image processing is displayed in the area according to the movement or transformation of the area in the area moving and transforming step and that the image before being subjected to image processing in the image processing step is displayed in the remaining area of the display image.

According to a fourth aspect of the present invention, there is provided a recording medium which holds an image processing program to be executed on an image processing apparatus including processing means for processing an image and a display for displaying an image, wherein the image processing program causes a computer to execute the following steps: an image specifying step of specifying an original image to be processed; an image displaying step of displaying on the display a display image of the original image specified in the image specifying step; an image dividing step of dividing the display image displayed in the image displaying step into a plurality of movable or transformable areas; an area selecting step of selecting one of the areas of the display image divided in the image dividing step; an image processing specifying step of specifying image processing to be performed on the area of the display image selected in the area selecting step; an image processing step of creating a processed image obtained by subjecting the display image to image processing specified in the image processing specifying step; a display updating step of replacing the selected area of the display image with the area corresponding to the image subjected to image processing in the image processing step; and an area moving and transforming step of moving or transforming the area selected in the area selecting step, wherein the display updating step is to update the display image in such a manner that the result of the image processing is displayed in the area according to the movement or transformation of the area in the area moving and transforming step and that the image before being subjected to image processing in the image processing step is displayed in the remaining area of the display image.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 shows the configuration of an image processing apparatus;

FIG. 5 shows the procedure to give an outline of an image displaying process;

FIG. 8 is a flowchart to help explain the procedure for an image display area updating process;

DETAILED DESCRIPTION OF THE INVENTION

First Embodiment

In an image processing method according to an embodiment of the present invention, the user processes and edits an image on the basis of an image processing screen displayed on the display section of an image processing apparatus.

Figure 1:
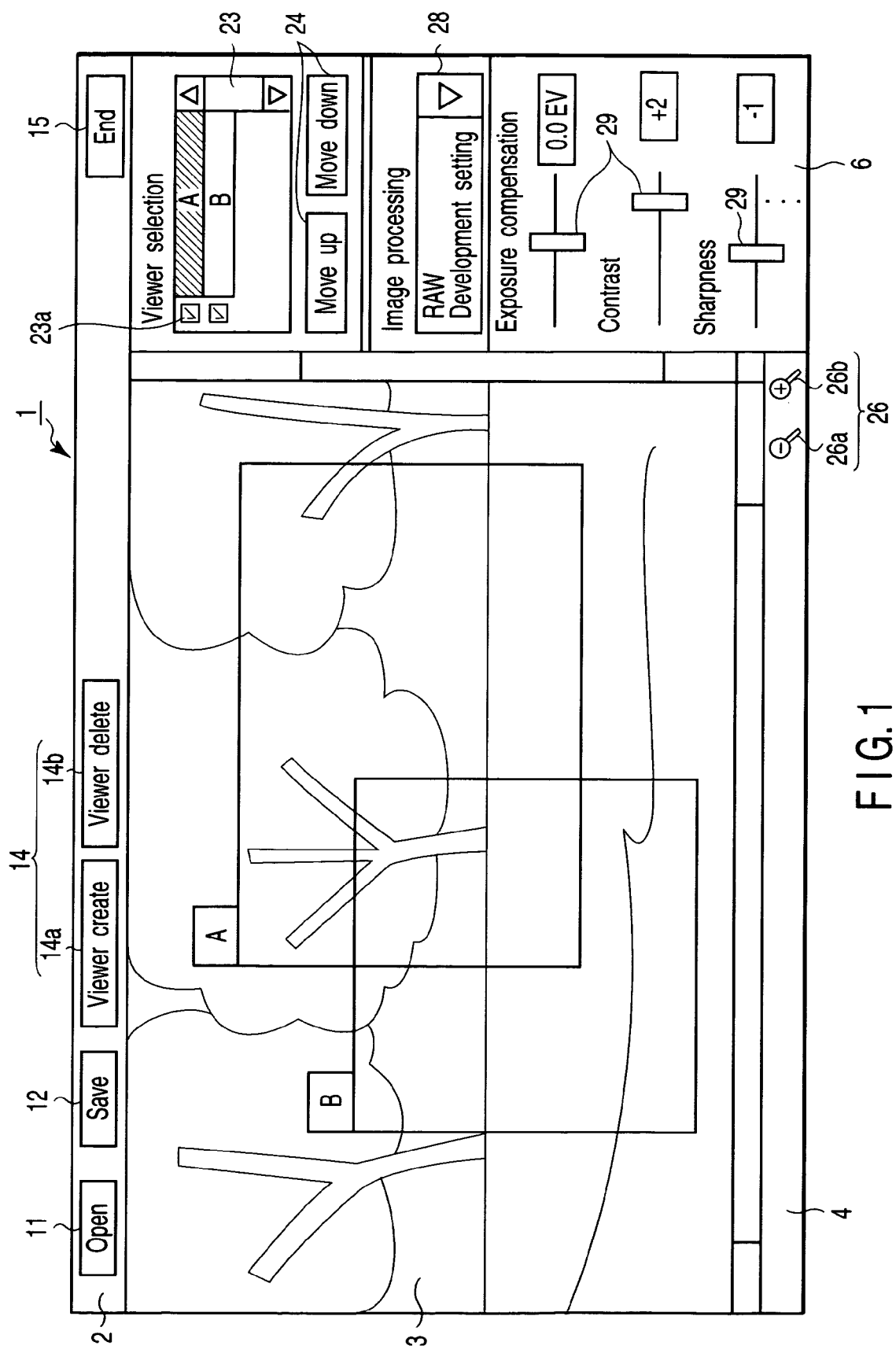
FIG. 1 shows the configuration of an image processing screen in an image processing method according to a first embodiment of the present invention.

FIG. 1 shows the configuration of an image processing screen in an image processing method according to a first embodiment of the present invention.

The image processing screen 1 is composed of a toolbar area 2, an image display area 3, a display operation area 4, and a parameter area 6. In the toolbar area 2, there are provided various buttons for performing operations related to image processing. The image display area 3 combines an original image, an image before image processing, with an image after image processing and displays the resulting image. The display operation area 4 has operation buttons for enlarging and reducing an image. In the parameter area 6, operation modules and the like for specifying parameters related to image processing are displayed.

In the toolbar area 2, there are provided Open button 11, Save button 12, Viewer Create button 14 related to viewer operations, Viewer Delete button 14b, and End button 15. Open button 11 is for selecting an original image to be subjected to image processing. Save button 12 is for saving the original image subjected to image processing using a determined image processing parameter. Viewer Create button 14a is for creating a viewer in the image display area 3. Viewer Delete button 14b deletes the viewer from the image display area 3. End button 15 is for closing the image processing screen 1.

In the image display area 3, a plurality of viewers can be created. A viewer specifies a partial area in the image display area. The user can set various image processing parameters, process the image in the partial area, and check the result of the process with a viewer. In the image display area, a plurality of viewers can be created. The display position and display size of a viewer can be changed. FIG. 1 shows viewer A and viewer B.

When there is an area C where viewer A and viewer B overlap with each other as shown in FIG. 1, the image processing parameters applied to the respective viewers are applied to the area C repeatedly. This will be explained in detail later.

In the display operation area 4, there are provided a zoom-out button 26a and a zoom-in button 26b. The zoom-out button 26a reduces the image displayed in the image display area 3. The zoom-in button 26b enlarges the image displayed in the image display area 3.

In the parameter area 6, there are provided a viewer selection list 23, a move button 24, an image processing selection list 28, and parameter specify controllers 29. The viewer selection list 23 displays the names of viewers, which makes it possible to specify a viewer to be subjected to image processing. The move button 24 is for changing the order in which the names of viewers are arranged in the viewer selection list. In the image processing selection list 28, there are provided a plurality of image processing items, which enable the user to select desired image processing. The parameter specify controllers 29 are modules for inputting the image processing parameter corresponding to the image processing item selected by the user.

Referring to FIG. 1, an outline of the image display method will be explained.

When the user displays the image processing screen 1, operation buttons 11 to 15 appear in the toolbar area 2. When the user presses Open button 11, a plurality of folders hierarchized are displayed. Then, when the user retrieves a folder and specifies an image to be processed, the image appears in the image display area 3.

Next, when the user presses Viewer Create button 14a, viewer A appears in the image display area 3. Viewer A can be clicked with the mouse and dragged to a desired position. With viewer A being displayed, when the user presses Viewer create button 14a again, viewer B appears in the image display area 3. Viewer B can also be clicked with the mouse and dragged to a desired position. A part of viewer B can be overlapped with viewer A.

When the user specifies a viewer and presses Viewer Delete button 14b, the viewer is deleted from the image display area 3. When a viewer is newly created, the name of the viewer is added to the viewer selection list 23. When a viewer is deleted, the name of the viewer is deleted from the viewer selection list 23.

The user can specify the name of a desired viewer in the viewer selection list 23, thereby selecting the desired viewer. The selected viewer is enclosed with a red frame in the image display area 3, which indicates that the viewer has been selected. The user can specify the name of a viewer in the viewer selection list 23 and operate the move button 24, thereby changing the order in which the names of viewers are displayed in the viewer selection list 23. For example, when the user selects viewer A and operates the "Move Down" button, viewer A moves next to viewer B.

Figure 2:
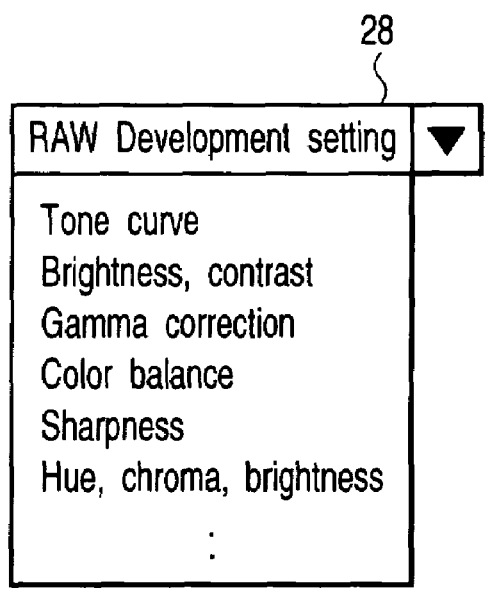
FIG. 2 shows image processing items.

When the user operates the image processing selection list 28, image processing items appear in a pull-down menu as shown in FIG. 2. When the user selects a desired image processing item, at least one parameter specify controller 24 corresponding to the selection is added to the parameter area 6. Then, when the user operates the parameter specify controller 29, the image displayed on the selected viewer is subjected to image processing on the basis of its processing parameter. Accordingly, in the image display area 3, the image subjected to image processing in the viewer is combined with the original image and the resulting image is displayed. Therefore, the original image and the processed image can be compared with each other flexibly on a single screen.

The overlapping part is subjected to image processing in the order displayed in the viewer selection list 23. For example, when viewer A and viewer B are displayed in the viewer selection list 23 in that order, the overlapping part is first subjected to image processing applied to viewer A, followed by image processing applied to viewer B.

Operating the zoom buttons 26a, 26b enable the whole of the image in the image display area 3 to be reduced and enlarged. Thus, the result of the image processing can be checked minutely. In addition, a wide area can be understood easily.

When the user operates Save button 12, the original image is subjected to image processing on the basis of the image processing parameter specified for the selected viewer and the resulting image is saved in a specific image folder. The presence or absence of image processing at the time of saving can be set by checking a save check box 23a attached to the viewer selection list 23. For example, when the check boxes of viewer A and viewer B are both checked, the original image is subjected to image processing in viewer A and viewer B in that order and the resulting image is saved. When only the check box of viewer B is checked, the original image is subjected to only image processing in viewer B and the resulting image is saved. Then, when the user operates End button 15, the image processing screen 1 is closed.

The configuration of the image processing apparatus to realize the image processing method and the main processing procedure will be explained.

FIG. 3 shows the configuration of the image processing apparatus 30. The image processing apparatus 30 comprises a display section 31, an operation input section 32, a communication interface 33, a display memory 34, a program memory 36, and a processing section 37.

The display section 31 is a CRT or a TFT liquid-crystal display which displays the image processing screen 1. The operation input section 32 is an input device, such as a keyboard or a mouse for receiving an operation instruction from the user. The communication interface 33 exchanges information, such as image data, with an external device.

The display memory 34 is provided with a plurality of buffer memories. Stored in the buffer memories are images displayed in the image display area 3, that is, (1) the original image, (2) images related to various viewers, and (3) images subjected to superimposition. For example, when two viewers are displayed, the following four buffer memories are created: (a) a buffer memory which stores the original image, (b) a buffer memory which stores the image obtained by processing the original image using the image parameter of viewer A, (c) a buffer memory which stores the image obtained by processing the original image using the image parameter of viewer B, and (d) a buffer memory which stores the image obtained by processing the original image using the image parameters of viewer A and viewer B.

Figure 4:
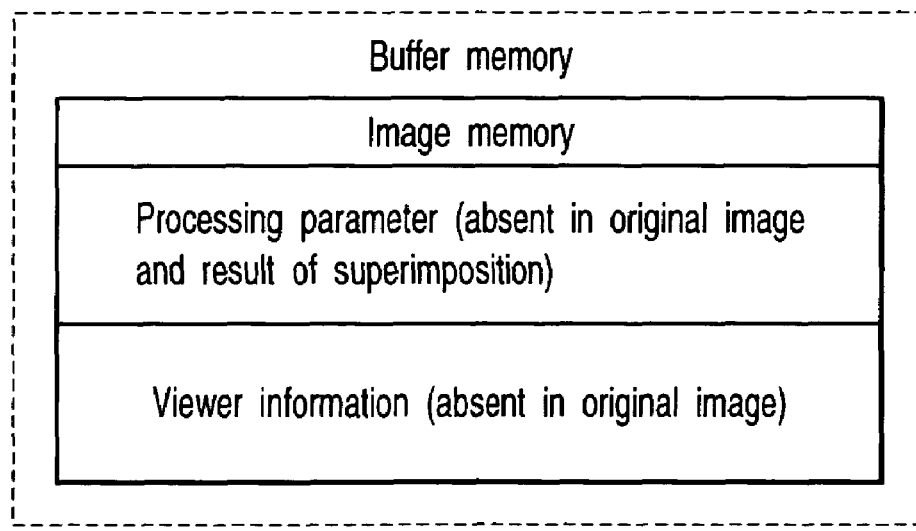
FIG. 4 shows information stored in a buffer memory.

FIG. 4 shows information stored in the buffer memory. In the buffer memory, "Image memory", "Processing parameter", and "Viewer information" are stored. "Image memory" stores image data to be displayed in the image display area 3. "Processing parameter" stores a specified image processing parameter. When the buffer memory holds the original image, no processing parameter is stored. In addition, when the memory buffer holds an superimposed image, no processing parameter is stored. This is because there is no need to store any processing parameter repeatedly, because processing is done using the processing parameter in the buffer memory for each viewer. "Viewer information" stores information about the size and display position of the viewer.

The program memory 36 stores a program which controls each function of the image processing apparatus 30. The processing section 37 supervises the operation of the image processing apparatus 30.

Next, referring to FIGS. 5 to 13, an outline of the procedure for image processing will be explained. The processes explained below are about the main part of the image processing functions. Therefore, although not explained below, the functions written in FIGS. 1 to 4 are included in the image processing functions.

When the user starts image processing, the processing section 37 displays the image processing screen 1 on the display section 31 in step S01 of FIG. 5. Then, the user operates the operation input section 32 and further operates various operation buttons on the image processing screen 1, the processes corresponding to the operated buttons are carried out.

When the user operates Open button 11 or Save button 12 in the toolbar area 2, a file operation process (FIG. 6) is executed in step S02.

Figure 6:
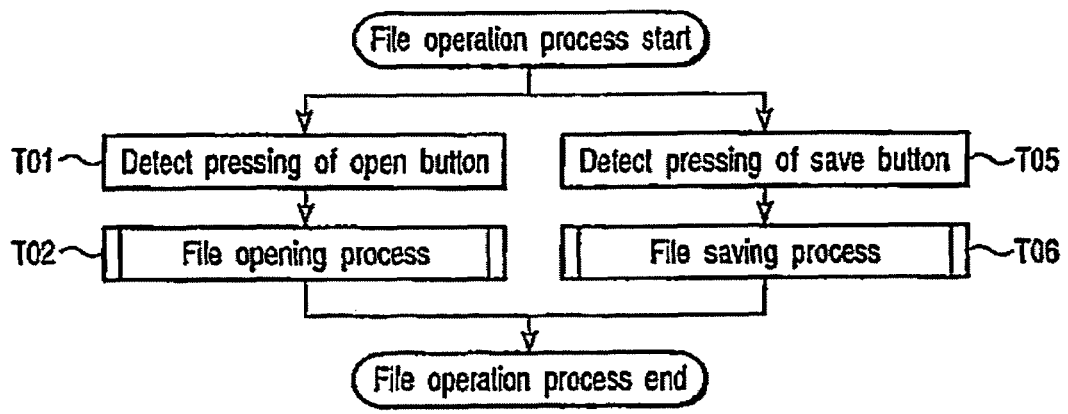
FIG. 6 is a flowchart to help explain the procedure for a file operation process.

In step T01 of FIG. 6, if the operation of Open button 11 is detected, the process of opening a file (FIG. 7) in step T02 is started.

Figure 7:
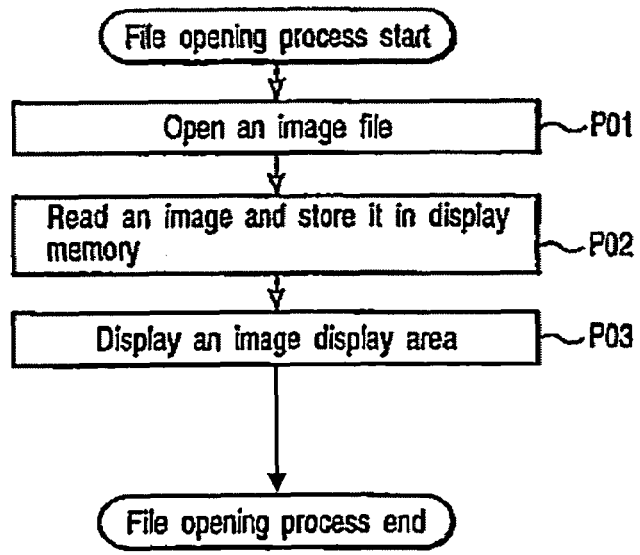
FIG. 7 is a flowchart to help explain the procedure for a file opening process.

In step P01 to step P03 of FIG. 7, the image specified by the user is read and then is not only stored as the original image in the display memory 34 but also displayed in the image display area 3.

After the file opening process is completed, control returns to FIG. 5 and the user's next operation is waited for.

In step T05 of FIG. 6, if the operation of Save button 12 is detected, a file saving process (FIG. 9) in step T06 is started.

Figure 9:
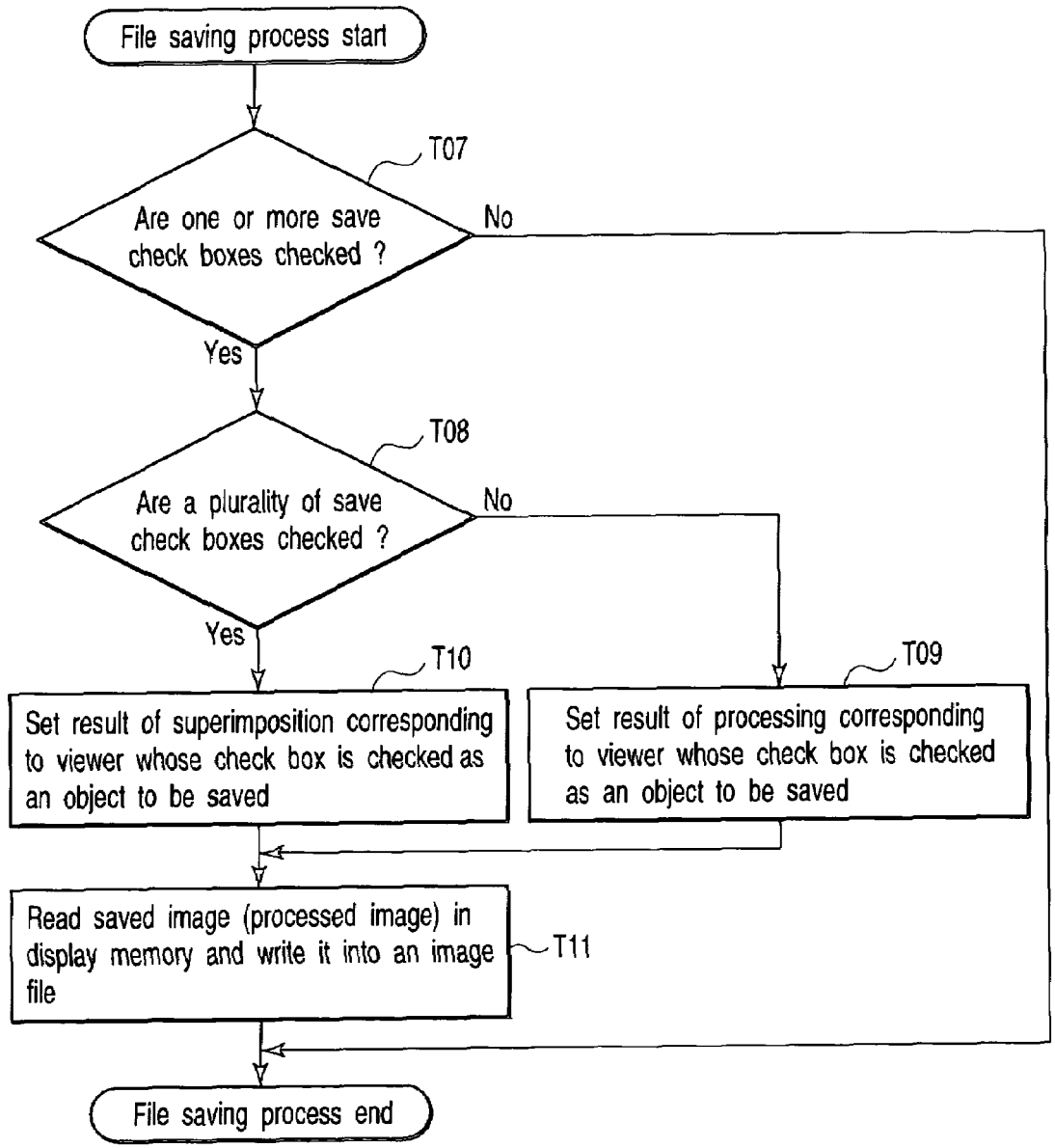
FIG. 9 is a flowchart to help explain the procedure for a file saving process.

In step T07 of FIG. 9, it is determined whether the save check box 23a in the parameter area 6 is checked. If NO in step T07, that is, if the save check box 23a is not checked, saving is not done and the process is ended. If YES in step T07, that is, if the save check box 23a is checked, it is determined in step T08 whether a plurality of save check boxes 23a are checked.

If NO in step T08, that is, if only one of the save check boxes 23a is checked, the processed image corresponding to the viewer whose check box is checked is set as an image to be stored in step T09. If YES in step T08, that is, if more than one of the save check boxes 23a is checked, the superimposed image corresponding to the viewer whose check box is checked is set as an image to be stored. Then, in step T11, the image to be stored is read and saved in a specific file.

After the file saving process is completed, control returns to FIG. 5 and the user's next operation is waited for.

In FIG. 5, when the user operates Viewer Crete button 14a in the toolbar area 2, a viewer operation process (FIG. 10) is carried out in step S03.

Figure 10:
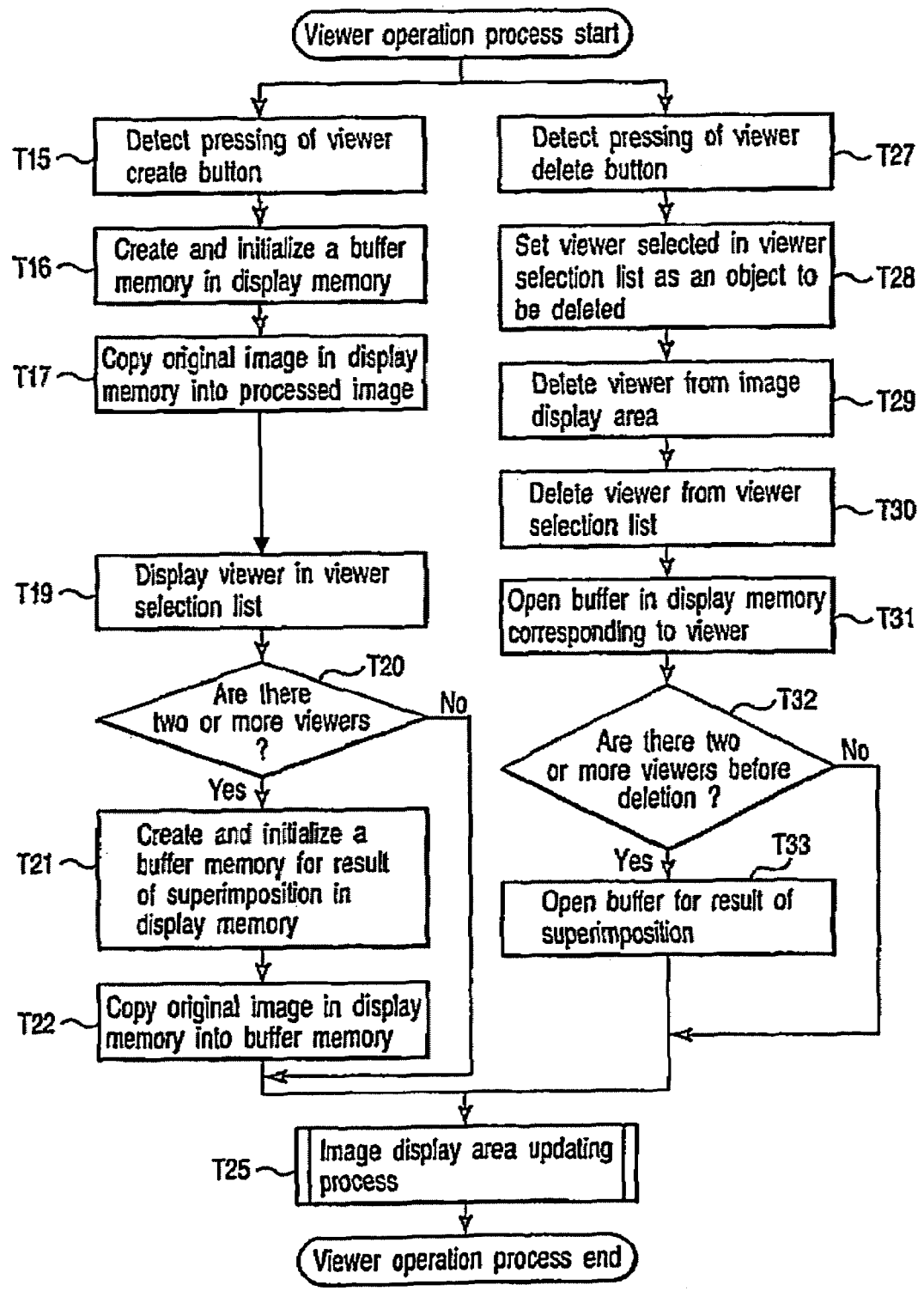
FIG. 10 is a flowchart to help explain a viewer operation process.

In step T15 and step T16 of FIG. 10, if the pressing of Viewer Create button 14a is detected, a new buffer memory for a new viewer is created in the display memory 34 and then initialized. In step T17 to step T19, the original image in the display memory 34 is copied into "Image Memory" of the new buffer memory. Next, a new viewer is displayed in the image display area. At the same time, the name of the viewer is added to the viewer selection list 23.

Then, it is determined whether there are two or more viewers in the image display area. If YES in step T20, that is, if there are two or more viewers, a new buffer memory for the result of superimposition is created in the display memory 34 and is initialized. Then, the original image in the display memory 34 is copied into "Image Memory" of the new buffer memory. Next, an image display area updating process (FIG. 8) is carried out in step T25.

If NO in step T20, that is, if there is only one viewer in the image display area, an image display area updating process (FIG. 8) is carried out, because superimposition is unnecessary. Since the image display area updating process has been explained, its detailed explanation will be omitted.

After the viewer creating process is completed, control returns to FIG. 5 and the user's next operation is waited for.

In FIG. 5, when the user operates Viewer Delete button 14b in the toolbar area 2, a viewer operation process (FIG. 10) is carried out in step S03.

In step T27 and step T28 of FIG. 10, if the pressing of Viewer Delete button 14b is detected, the viewer selected from the viewer selection list 23 is to be deleted. Then, in step T29 to step T31, the relevant viewer is deleted from the image display area. At the same time, the name of the viewer is deleted from the viewer selection list 23 and the buffer of the display memory corresponding to the deleted viewer is opened.

In step Q01 of FIG. 8, the original image is read from the buffer memory of the display memory 34 and then is displayed in the image display area 3. In step Q02 and step Q03, the position, size, shape, and others of each viewer are read from "Viewer information" of the buffer memory. On the basis of these pieces of information, a frame line is displayed in each viewer.

Then, in step Q04 and step Q05, a partial image is extracted from the processed image stored in the buffer memory corresponding to each viewer and then is displayed inside the viewer. Thereafter, the partial image extracted from the superimposed image in the buffer memory is displayed in the area where viewers overlap with one another.

Then, it is determined whether there are two or more viewers in the image display area before deletion. If YES in step T32, that is, if there are two or more viewers, the buffer for the result of superimposition is opened in step T33. Then, the image display area updating process (FIG. 8) is carried out in step T25. If NO in step T32, that is, if there is only one viewer in the image display area before deletion, the image display area updating process (FIG. 8) is carried out, because there is no buffer for superimposition.

In FIG. 5, when the user operates the viewer selection list 23 in the parameter area 6, a viewer selection list operation process (FIG. 11) is carried out in step S04.

Figure 11:
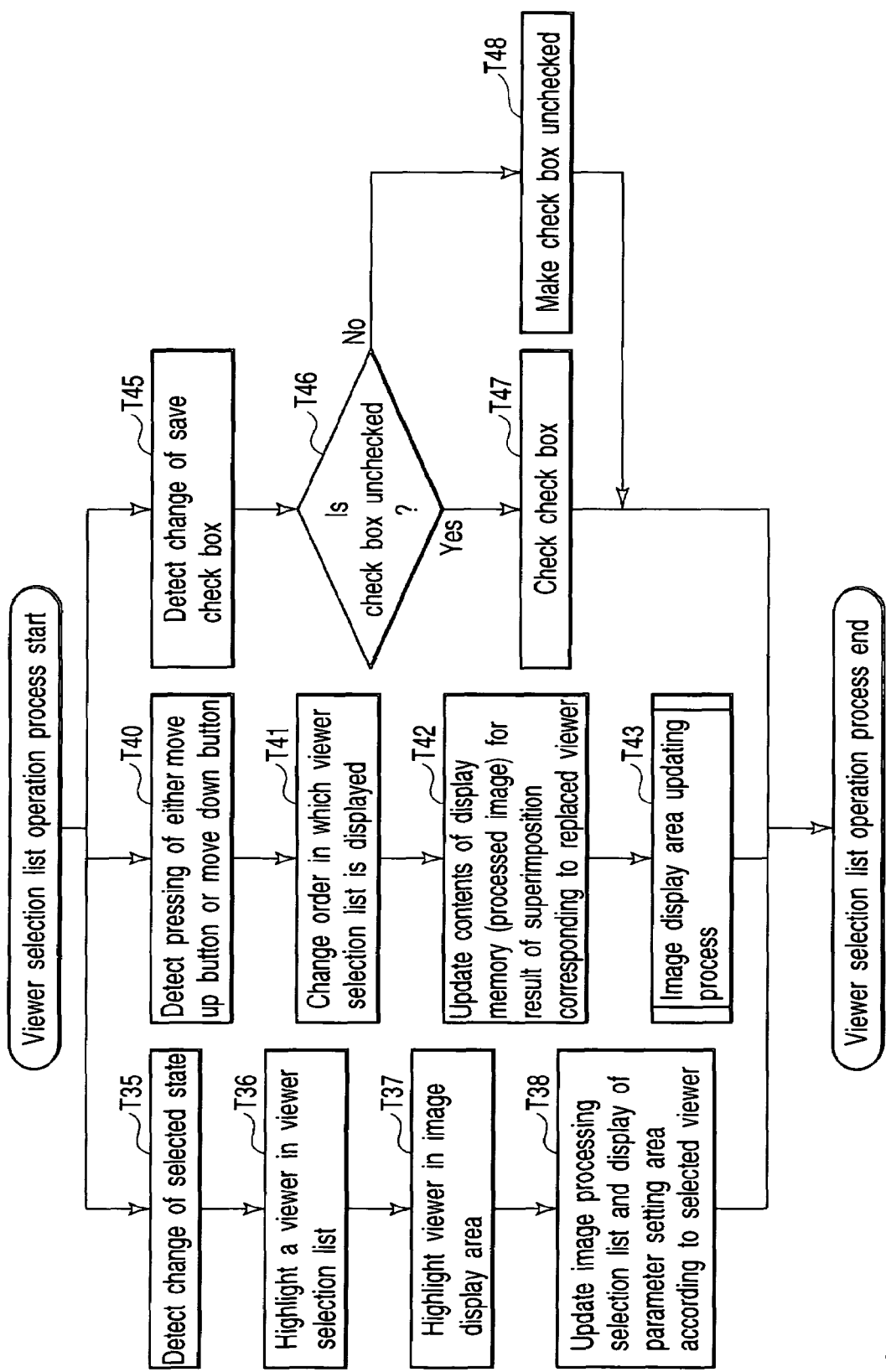
FIG. 11 is a flowchart for a viewer selection list operation process.

When the user changes the selection of the viewer name in the viewer selection list 23, the change of the selected state is detected and the newly selected viewer name is highlighted in step T35 to step T37 of FIG. 11. For instance, the color is changed to blue. At the same time, the viewer in the image display area is highlighted. For instance, the viewer is enclosed with a red frame. Then, in step T38, according to the selected viewer, the display of the image processing selection list 28 and parameter specify controllers 29 in the parameter setting area is updated and the viewer selection list operation process is ended.

When the user operates the move buttons 24, it is determined in step T40 and step T41 of FIG. 11 which of the "Move UP" button and "Move Down" button has been pressed. According to the pressed button, the order in which the viewer selection list 23 is displayed is changed.

Then, in step T42, the contents of the processed image in the buffer for the result of superimposition corresponding to the changed viewer are updated. That is, image processing is newly done according to the order in which the viewer selection list 23 is displayed. The resulting image is stored. Thereafter, the image display area updating process (FIG. 8) is carried out in step T43 and the viewer selection list operation process is ended. Since the image display area updating process has been explained, its explanation will be omitted.

When the user checks the save check box 23a, the checked check box 23a is determined in step T45 and step T46 of FIG. 11. If YES in step T46, that is, if the check box 23a before change has not been checked, the check box 23a is checked. If NO in step T46, that is, if the check box 23a before change has been checked, the check box 23a is made unchecked and the viewer selection list operation process is ended.

In FIG. 5, when the user operates the image processing selection list 28 or parameter specify controllers 29 in the parameter area 6, a parameter specify area operation process (FIG. 12) is carried out in step S05.

Figure 12:
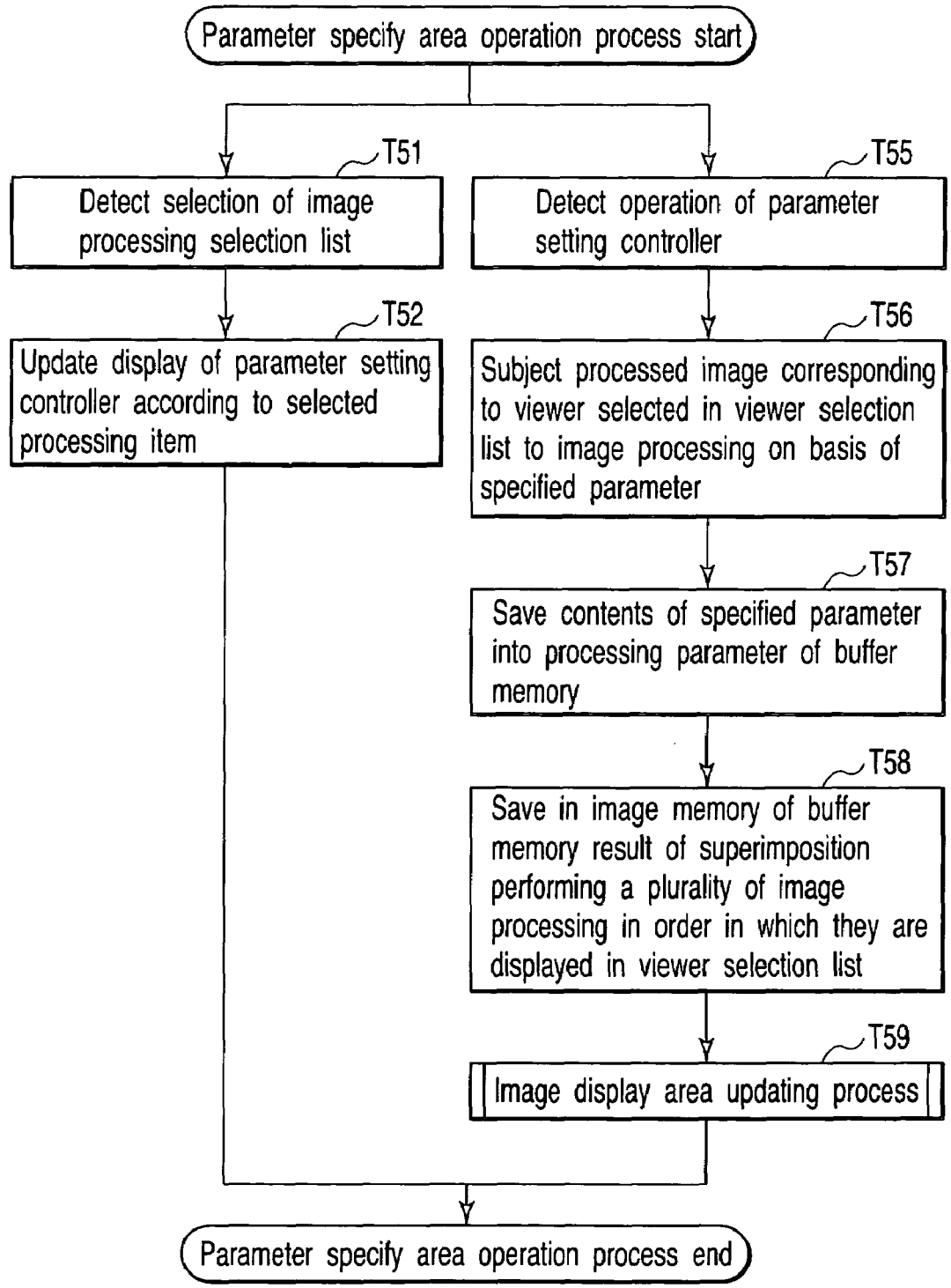
FIG. 12 is a flowchart to help explain the procedure for a parameter specify area operation process.

In step T51 and step T52 of FIG. 12, if the selection of the image processing selection list 28 is detected, the parameter specify controller 29 corresponding to the selected image processing item is added to the parameter area 6.

In step T55 and step S56, if the operation of the parameter specify controller 29 is detected, the processed image corresponding to the viewer selected from the viewer selection list 23 is subjected to image processing on the basis of the specified parameter. In step T57 and step T58, the contents of the specified parameter are stored in "Processing Parameter" of the buffer memory. At the same time, a plurality of image processing are performed in the order in which they are displayed in the viewer selection list 23. The resulting image is stored in "Image Memory" of the buffer memory. Then, an image display area updating process (FIG. 8) is carried out in step T59 and the parameter specify area operation process is ended. Since the image display area updating process has been explained, its detailed explanation will be omitted.

After the parameter area operation process is completed, control returns to FIG. 5 and the user's next operation is waited for.

In FIG. 5, when the user performs operations in the image display area 3 and operates the buttons in the display operation area 4, an image display area operation process (FIG. 13) is executed in step S06.

Figure 13:
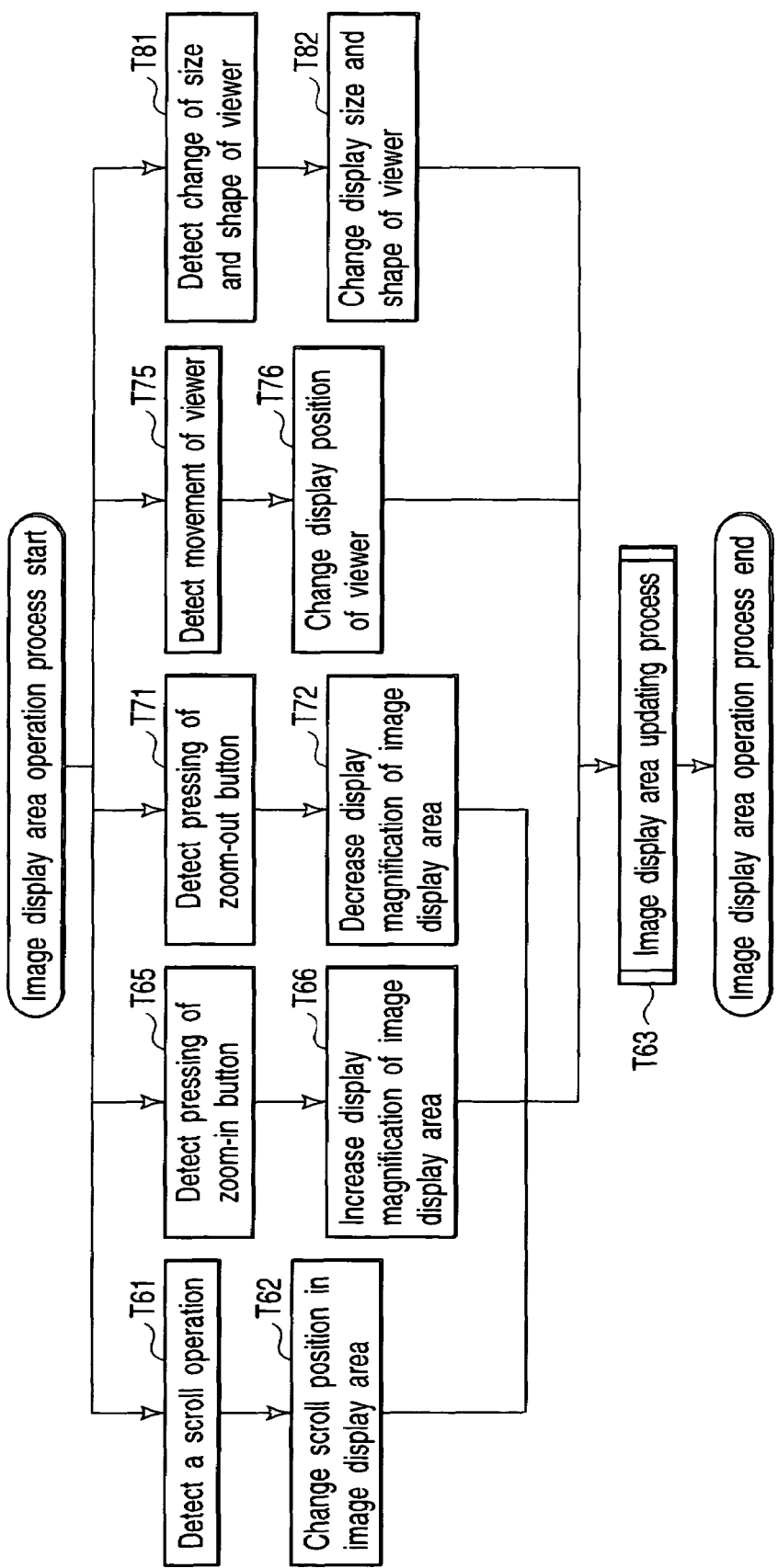
FIG. 13 is flowchart to help explain the procedure for an image display area operation process.

When the user operates the scroll bar in the image display area 3, the display in the image display area now selected is changed according to the scroll operation in step T61 and step T62 of FIG. 13. Then, in step T63, an image display updating process (FIG. 8) is carried out, thereby updating the contents displayed in the image display area 3. Since the image display area updating process has been explained, its detailed explanation will be omitted.

When the user operates the zoom-in button 26b, the display magnification of the image display area 3 is increased in step T65 and step T66 of FIG. 13. Then, In step T63, an image display area updating process (FIG. 8) is carried out, thereby updating the contents displayed in the image display area 3. Since the image display area updating process has been explained, its detailed explanation will be omitted.

When the user operates the zoom-out button 26a, the display magnification of the image display area 3 is decreased in step T71 and step T72 of FIG. 13. Then, in step T63, an image display area updating process (FIG. 8) is carried out, thereby updating the contents displayed in the image display area 3. Since the image display area updating process has been explained, its detailed explanation will be omitted.

When the user clicks and drags the viewer with the mouse, the display position is changed according to the movement of the viewer in step T75 and step T76 of FIG. 13. Then, in step T63, an image display area updating process (FIG. 8) is carried out, thereby updating the contents displayed in the image display area 3. Since the image display area updating process has been explained, its detailed explanation will be omitted.

When the user clicks and drags the outer frame of the viewer with the mouse, the display size and shape of the viewer are changed according to the movement of the mouse in step T81 and step T82 of FIG. 13. Then, in step T63, an image display area updating process (FIG. 8) is carried out in step T63, thereby updating the contents displayed in the image display-area 3. Since the image display area updating process has been explained, its detailed explanation will be omitted.

After the image display area operation process is completed, control returns to FIG. 5 and the user's next operation is waited for.

In FIG. 5, when the user operate End button 15, the end operation is detected in step S07 and the image processing screen 1 is closed.

In the embodiment, when image editing, such as raw developing, is done, a part of the selected image can be set as a processing area and parameters can be set while comparing the results of editing in real time. Therefore, the effect of image processing can be checked easily. In particular, the effects of a plurality of image processing can be judged at a glance.

The position, size, and shape of the selected area (the range where an image is processed) can be changed freely. Moreover, a plurality of selected areas can be provided. The plurality of selected areas can be moved arbitrarily at the same time. Accordingly, the configuration excels in operability and is user-friendly.

Furthermore, since the zoom buttons 26a, 26b are provided, the whole of an image can be enlarged and reduced. This enables the result of image processing to be checked minutely and a wide area to be grasped easily as an object to be processed.

As described above, with the first embodiment, the result of image processing can be checked easily and the user interface function for image processing can be enhanced.

Second Embodiment

Figure 14:
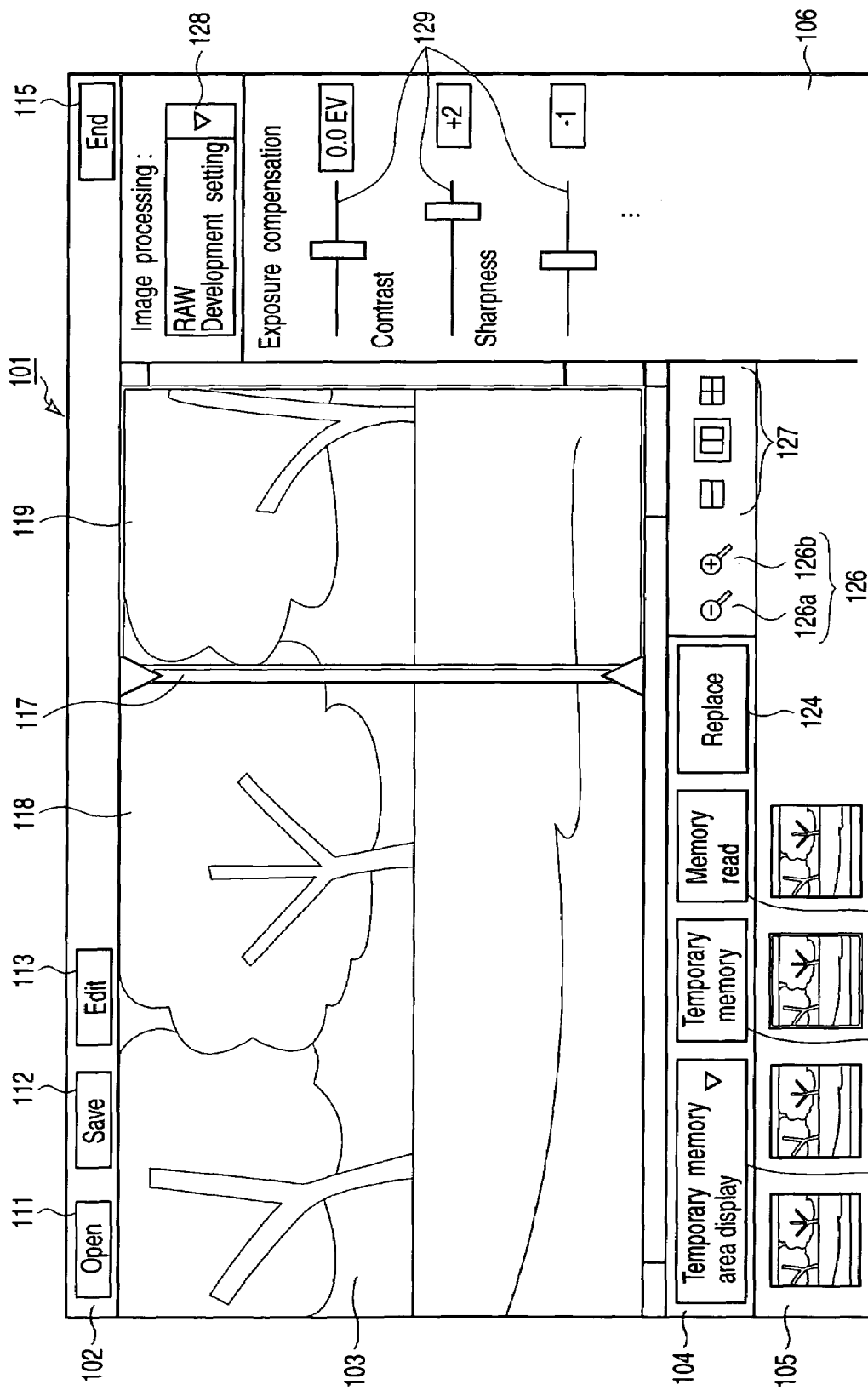
FIG. 14 shows the configuration of an image processing screen in an image display method according to a second embodiment of the present invention.

FIG. 14 shows the configuration of an image processing screen in an image display method according to a second embodiment of the present invention. The configuration of the image processing screen 101 of the second embodiment differs from that of the image processing screen 1 of the first embodiment. Using different reference numerals from those in the first embodiment, the configuration and functions of the image processing screen 101 will be explained.

The image processing screen 101 is composed of a toolbar area 102, an image display area 103, a temporary memory operation area 104, a temporary memory display area 105, and a parameter area 106. In the toolbar area 102, there are provided various buttons for performing operations related to image processing. The image display area 103 combines an original image, an image before image processing, with an image after image processing and displays the resulting image. The temporary memory operation area 104 is provided with various operation buttons for storing the processed image temporarily and reading the image. The temporary memory display area 105 is for displaying a thumbnail of the processed image temporarily stored. In the parameter area 106, operation modules for specifying the type of image processing and its parameters are displayed.

In the toolbar area 102, there are provided Open button 111, Save button 112, Edit button 113, and End button 115.

Open button 111 is for selecting an original image to be subjected to image processing. Save button 112 is for saving the original image subjected to image processing using determined image processing parameters. Edit button 113 is for enabling an image to be processed and edited on the image processing screen 101. End button 115 is for closing the image processing screen 101.

In the image display area 103, there are provided an original image display area 118 and a processed image display area 119, with a dividing line 117 between them. In the processed image display area 119, a part of the original image subjected to image processing is displayed. The original image display area 118 and the processed image display area 119 constitute the whole of the original image.

In the temporary memory operation area 104, there are provided a temporary memory area display button 121, a temporary memory button 122, a memory read button 123, a replace button 124, zoom buttons 126, and split mode buttons 127. The temporary memory area display button 121 switches between the display of and the nondisplay of the temporary memory display area 105. The temporary memory button 122 is for storing a processed image in the temporary memory. The memory read button 123 is for reading the processed image stored in the temporary memory and displaying the image in the processed image display area 119. The zoom buttons 126, which are composed of a zoom-out button 126a and a zoom-in button 126b, reduce and enlarge the image displayed in the image display area 103. the split mode buttons 127 change the number of divisions of the image displayed in the image display area 103, that is, the number of areas.

In the temporary memory display area 105, a thumbnail of the processed image stored in the temporary memory (explained later) is displayed.

In the parameter area 106, there are provided an image processing selection list 128 and parameter specify controllers 129. In the image processing selection list 128, there are provided a plurality of image processing items, which enables the user to select desired image processing. The parameter specify controllers 129 are operation modules for inputting the image processing parameters corresponding to the image processing items selected by the user.

Next, referring to FIG. 14, an outline of the image display method will be explained.

When the user displays the image processing screen 101, the operation buttons 111 to 115 appear in the toolbar area 102. When the user presses Open button 111, a plurality of folders hierarchized are displayed. Then, when the user retrieves a folder and specifies an image to be processed, the image is displayed in the image display area 103.

Next, when the user operates Edit button 113, the mode is changed to a mode which enables image processing. At the same time, a dividing line 117 appears in the image display area 103. The shape of the dividing line 117 can be changed to, for example, vertical two-way split, horizontal two-way split, four-way split, and the like by selecting one of the split mode buttons 127. Each time the user presses the replace button 124, the position of the processed image display area 119 can be changed. For example, in the case of a two-way split screen, each time the user presses the replace button 124, the position of the processed image display area 119 is replaced with the other alternately. In the case of a four-way split screen, each time the user presses the replace button 124, the position of the processed image display area 119 is changed clockwise. In FIG. 14, the image display area 103 is divided into two vertically. The left area is set as the original image display area 118 and the right area is set as the processed image display area 119. The area set as the processed image display area 119 is designed to enable the user to recognize the area easily by, for example, enclosing the area with a red frame on the display screen.

Figure 15:
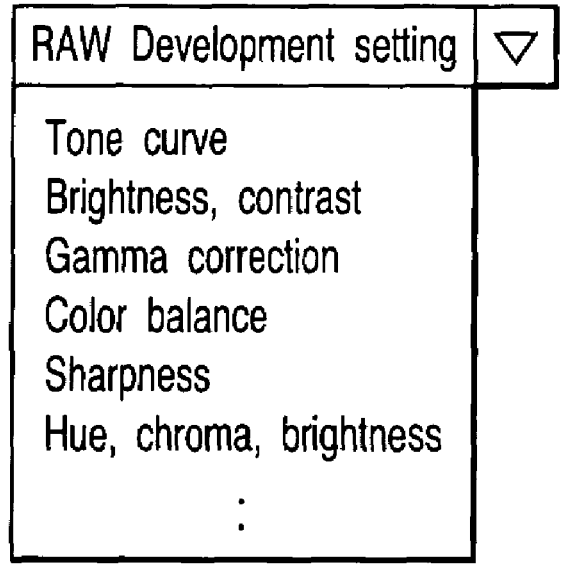
FIG. 15 shows image processing items.

When the user operates the image processing selection list 128, a pull-down menu of image processing items appears as shown in FIG. 15. When the user selects a desired image processing item, at least one parameter specify controller 129 is added to the parameter area 106 according to the selection. When the user operates the parameter specify controller 129, the image displayed in the processed image display area 119 is subjected to image processing on the basis of the processing parameter. As a result, in the image display area 103, a part of the image subjected to image processing is combined with the original image and the resulting image is displayed. The position of the dividing line 117 can be move by a slide operation. Accordingly, the original image and the processed image can be compared with each other flexibly on a single screen.

When the user operates the zoom buttons 126a, 126b, the entire image can be enlarged and reduced, with the position of the dividing line 117 in the image display area 103 remaining unchanged. Therefore, the result of image processing can be checked minutely and a wide area can be set easily as an object to be processed.

Figure 16:
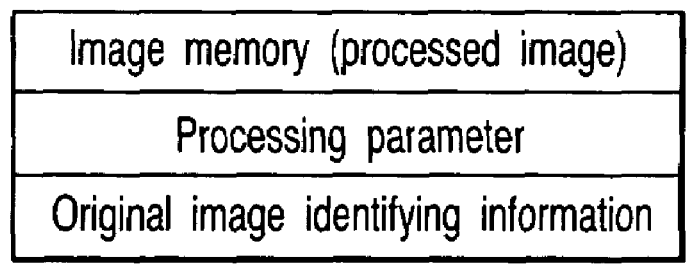
FIG. 16 shows information stored in a temporary memory.

When the user presses the temporary memory button 122, the image displayed in the processed image area 19 presently selected, its processing parameter, and information identifying the original image are stored in the temporary memory. FIG. 16 shows information stored in the temporary memory. At the same time, a thumbnail of the processed image is displayed in the temporary memory display area 105. The processed image stored in the temporary memory is an image obtained by subjecting the whole of the original image to image processing on the basis of the processing parameter.

Next, when the user selects one of the thumbnails displayed in the temporary memory display area 105 and operates the memory read button 123, the image processed using the processing parameter applied to the selected thumbnail is displayed in the processed image display area 119. Therefore, the image can be restored easily to the state stored in the temporary memory.

When the user operates Save button 112, the processing parameter of the image displayed in the processed image display area 119 presently selected is extracted. The processed image obtained by subjecting the original image to image processing on the basis of the image processing parameter is saved in a specific image folder. When the user operates End button 115, the image processing screen 101 is closed.

Next, the configuration of an image processing apparatus for realizing the above-described image display method and its main processing procedure will be explained.

Figure 17:
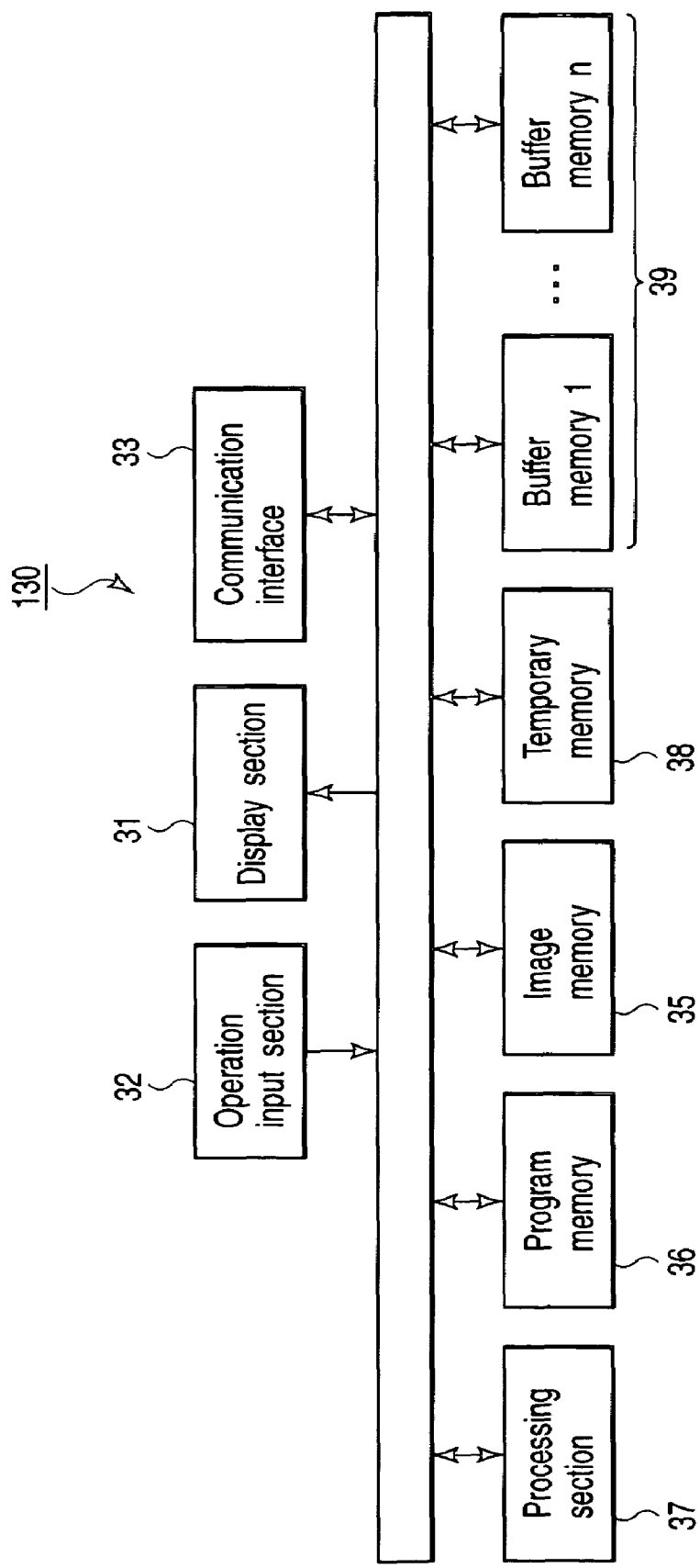
FIG. 17 shows the configuration of an image processing apparatus.

FIG. 17 shows the configuration of the image processing apparatus 130 of the second embodiment. The image processing apparatus 130 differs from that of the first embodiment in that it further includes an image memory 35 and a temporary memory 38 and has a buffer memory 39 in place of the display memory 34. The same parts as those in the first embodiment are indicated by the same reference numerals and an detailed explanation of them will be omitted.

The image memory 35 holds the original image. The temporary memory 38 stores an image subjected to image processing and the like temporarily. The buffer memory 39 is provided so as to correspond to the processed image display area 119. One buffer memory 39 is caused to correspond to one processed image display area 119. Accordingly, if the number of divisions of the image display area 103 is n, the number of buffer memories 39 is (n−1), that is, the total number of image areas n minus the original image display area 118.

Next, referring to FIGS. 18 to 26, an outline of the procedure for the image display process will be given. The processes explained below are the main part of the image display processing functions. Therefore, although not written in the explanation below, the functions shown in FIGS. 14 to 17 are included in the image display processing functions.

Figure 18:
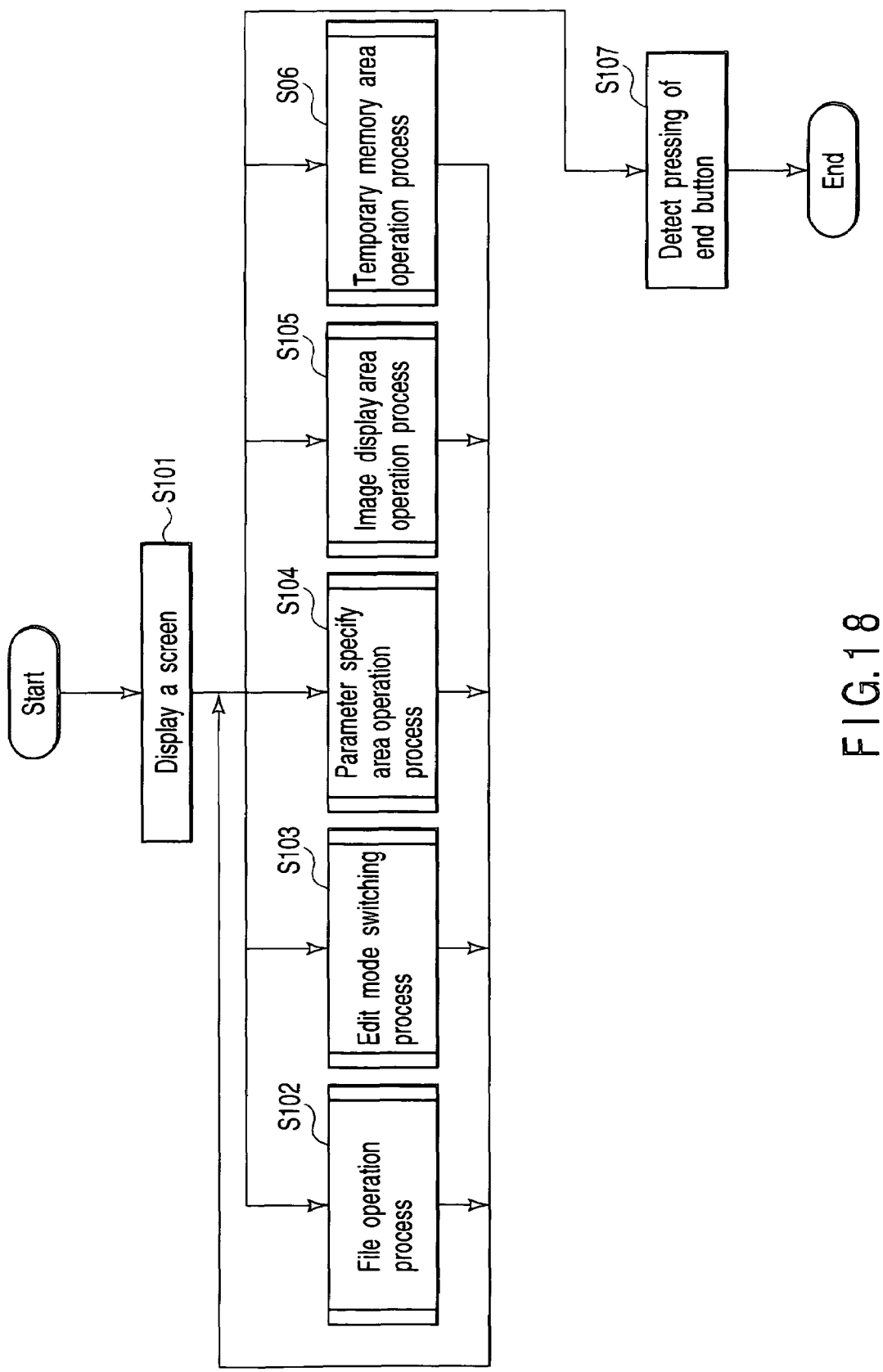
FIG. 18 shows the procedure to give an outline of an image displaying process.

When the user starts image processing, the processing section 37 displays the image processing screen 101 on the display section 31 in step S101 of FIG. 18. Next, when the user operates the operation input section 32 and then operates various operation buttons on the image processing screen 101, the processes corresponding to the operation buttons are carried out.

When the user operates Open button 111 or Save button 112 in the toolbar area 102, a file operation process (FIG. 19) in step S102 is carried out.

Figure 19:
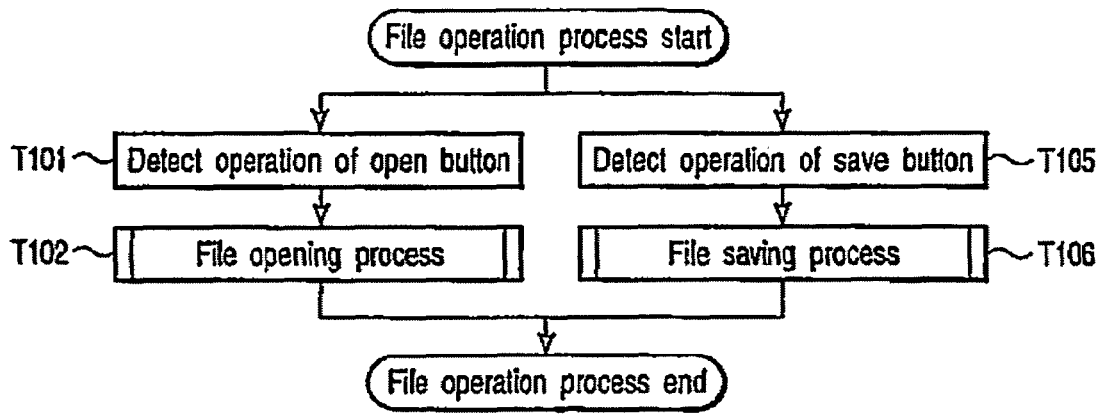
FIG. 19 is a flowchart to help explain the procedure for a file operation process.

If the operation of Open button 111 is detected in step T101 of FIG. 19, the operation of opening a file is started in step T102.

Figure 20:
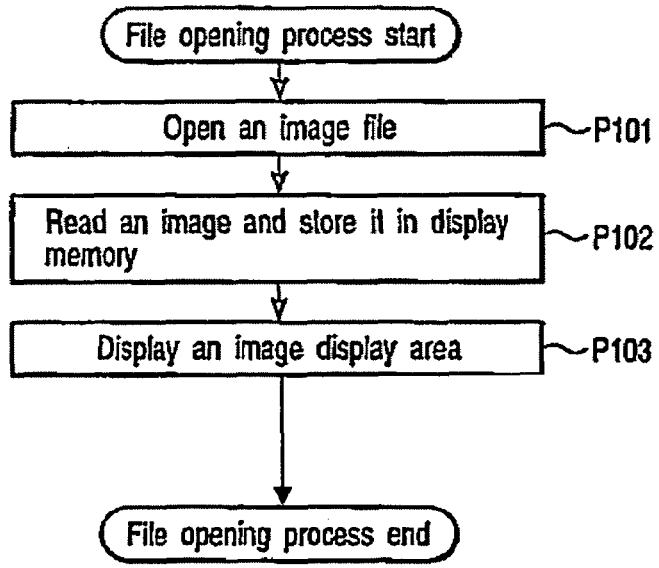
FIG. 20 is a flowchart to help explain the procedure for a file opening process.

In step P101 to P103 of FIG. 20, the image specified by the user is read and stored as the original image into the image memory 35. At the same time, the image display area 103 is displayed.

After the process of opening a file is completed, the user's next operation is waited for.

If the operation of Save button 112 is detected in step T105 of FIG. 19, a file saving process (FIG. 22) in step T106 is started.

Figure 22:
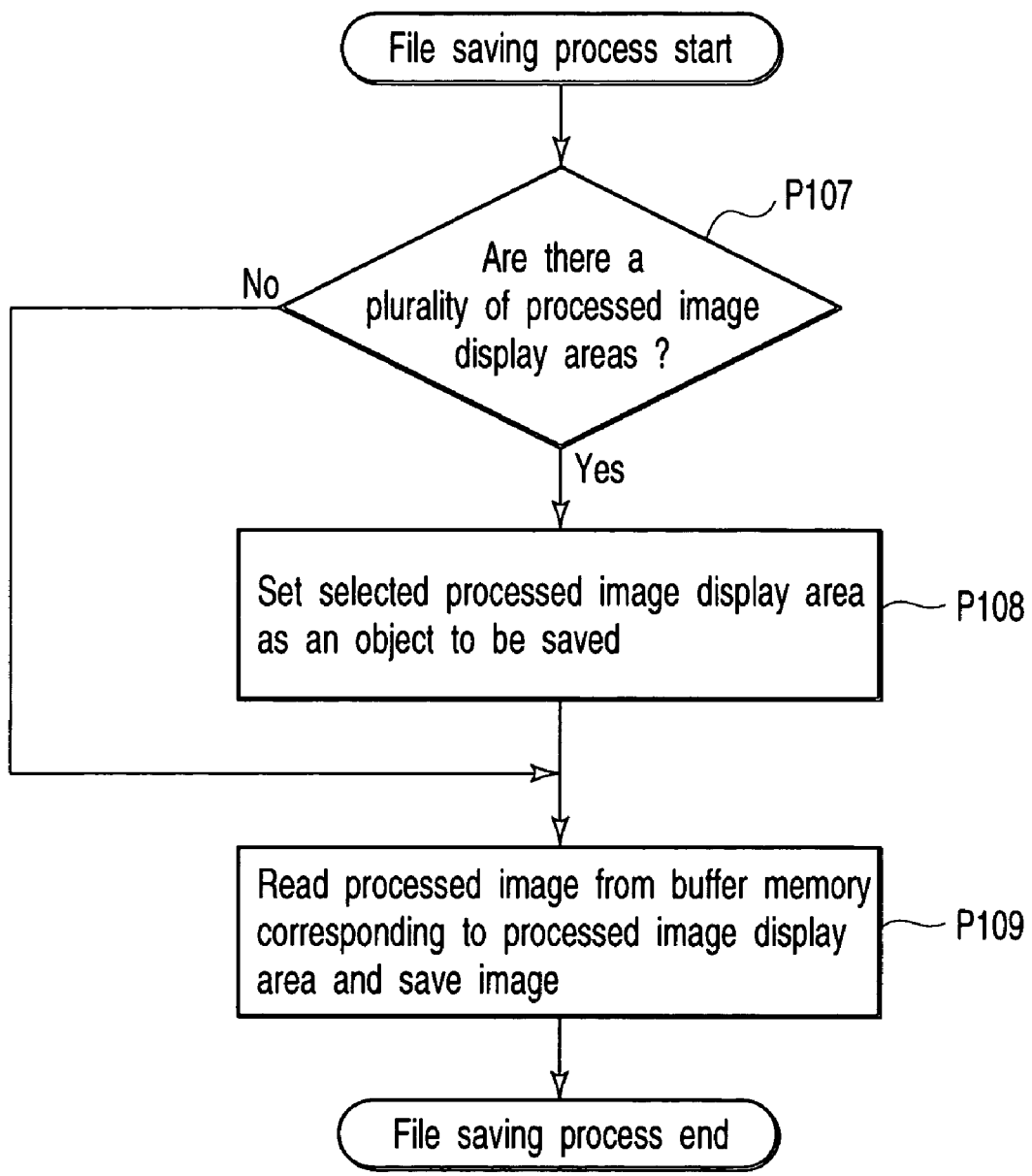
FIG. 22 is a flowchart to help explain the procedure for a file saving process.

In step P107 of FIG. 22, it is determined whether there are a plurality of processed image display areas 119. If YES in step T107, that is, if there are a plurality of processed image display areas, the processed image display area 119 selected by the user is set as an object to be saved in step P108. Then, in step P109, the processed image is read from the buffer memory 39 corresponding to the processed image display area 119 and is stored in a specific file.

After the file saving process is completed, control returns to FIG. 18 and the user's next operation is waited for.

When the user operates Edit button 113 in the toolbar area 102, an edit mode switching process (FIG. 23) in step S103 is carried out.

Figure 23:
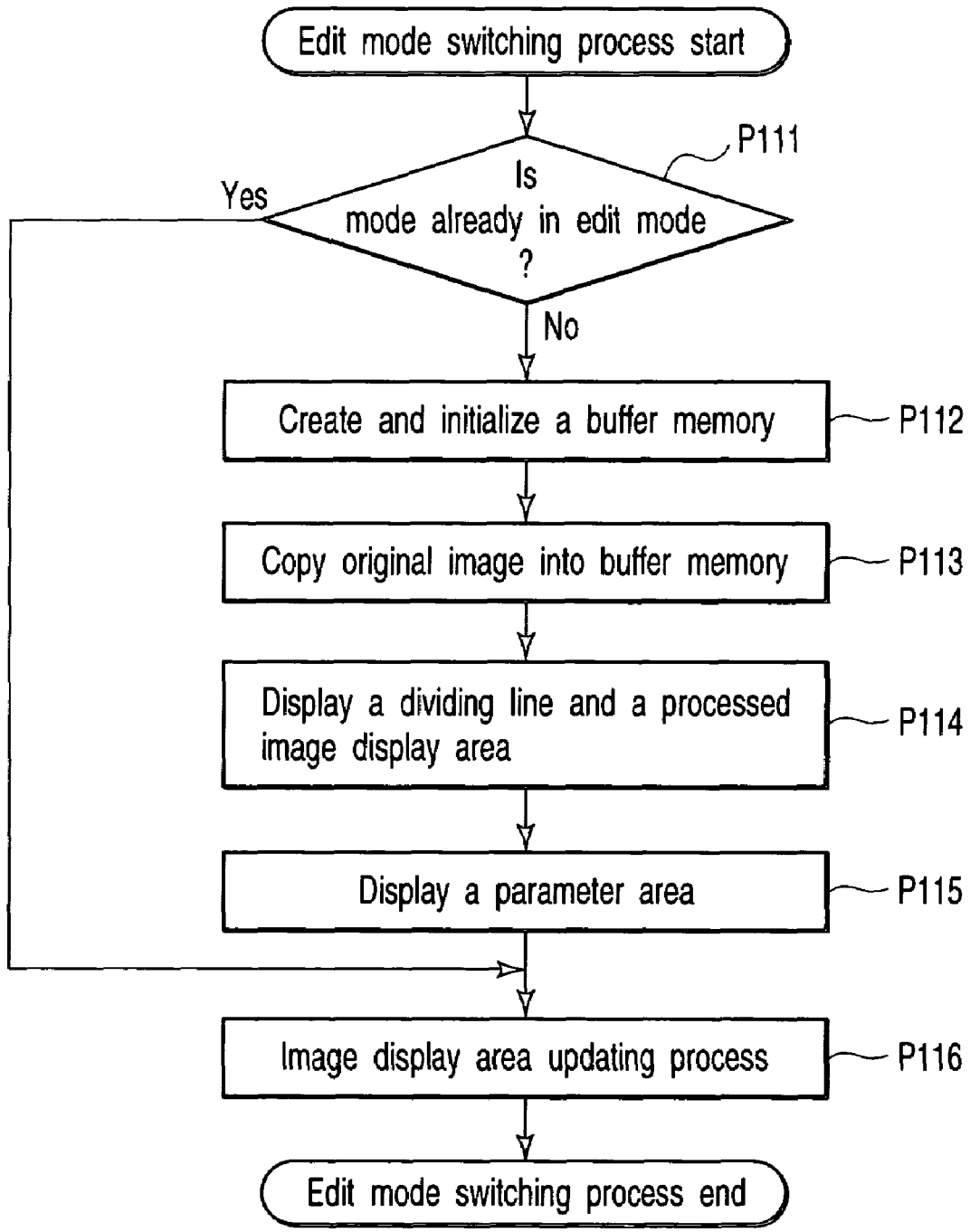
FIG. 23 is a flowchart to help explain the procedure for an edit mode switching process.

In step P111 of FIG. 23, it is determined whether the mode has been switched to the edit mode. If NO in step Pill, that is, the mode has not been switched to the edit mode, an initializing process is carried out. That is, in step P112 and step P113, as many buffer memories 39 as the number of divisions are created. The original image is copied into the created buffer memories 39.

Then, in step P114 and step P115, the dividing line 117, the processed image display area 119, and the parameter area 106 are displayed. In step P116, an image display area updating process (FIG. 21) is carried out, thereby updating the contents displayed in the image display area 103.

Figure 21:
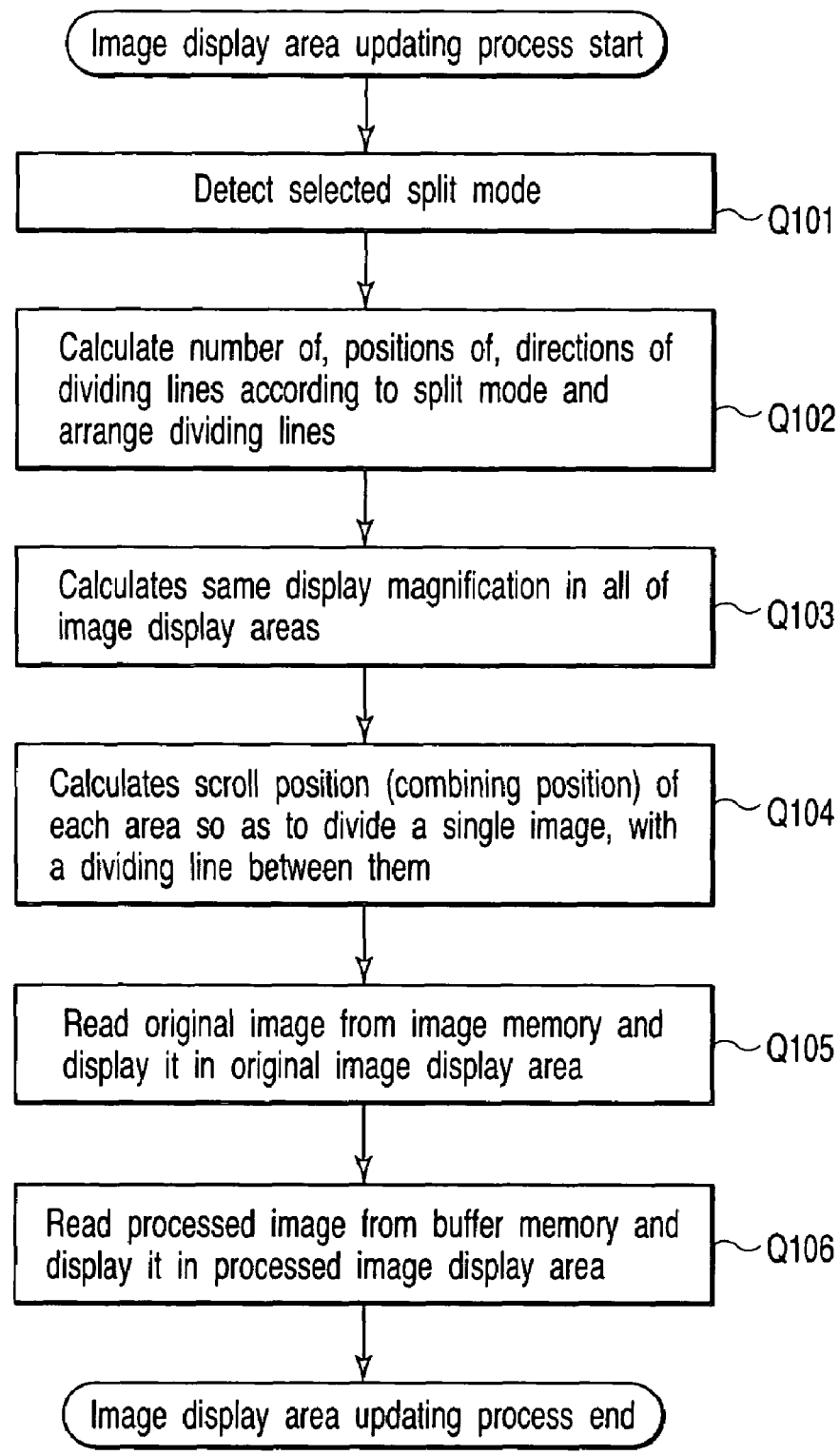
FIG. 21 is a flowchart to help explain the procedure for an image display area updating process.

In step, Q101 and step Q102 of FIG. 21, the selected split mode is detected. According to the split mode, the number of dividing lines, their positions, and their directions are calculated and arranged. Then, in step Q103 and step Q104, the same display magnification is calculated in all of the image display areas. At the same time, the scroll position (combining position) for each area is so calculated that a single image is divided into sub-images, with a dividing line 117 between them.

In step Q105 and step Q106, the original image is read from the image memory 35 and is displayed in the original image display area 118. In addition, the processed image is read from the buffer memory 39 and the part of the image corresponding to the combining position is displayed in the processed image display area 119. In the initial state where image processing has not been performed yet, the original image has been stored as the processed image in the buffer memory 39.

After the edit mode switching process is completed, control returns to FIG. 18 and the user's next operation is waited for.

In FIG. 18, when the user operates the image processing selection list 128 or parameter specify controllers 129 in the parameter area 106, a parameter specify area operation process (FIG. 24) in step S104 is carried out.

Figure 24:
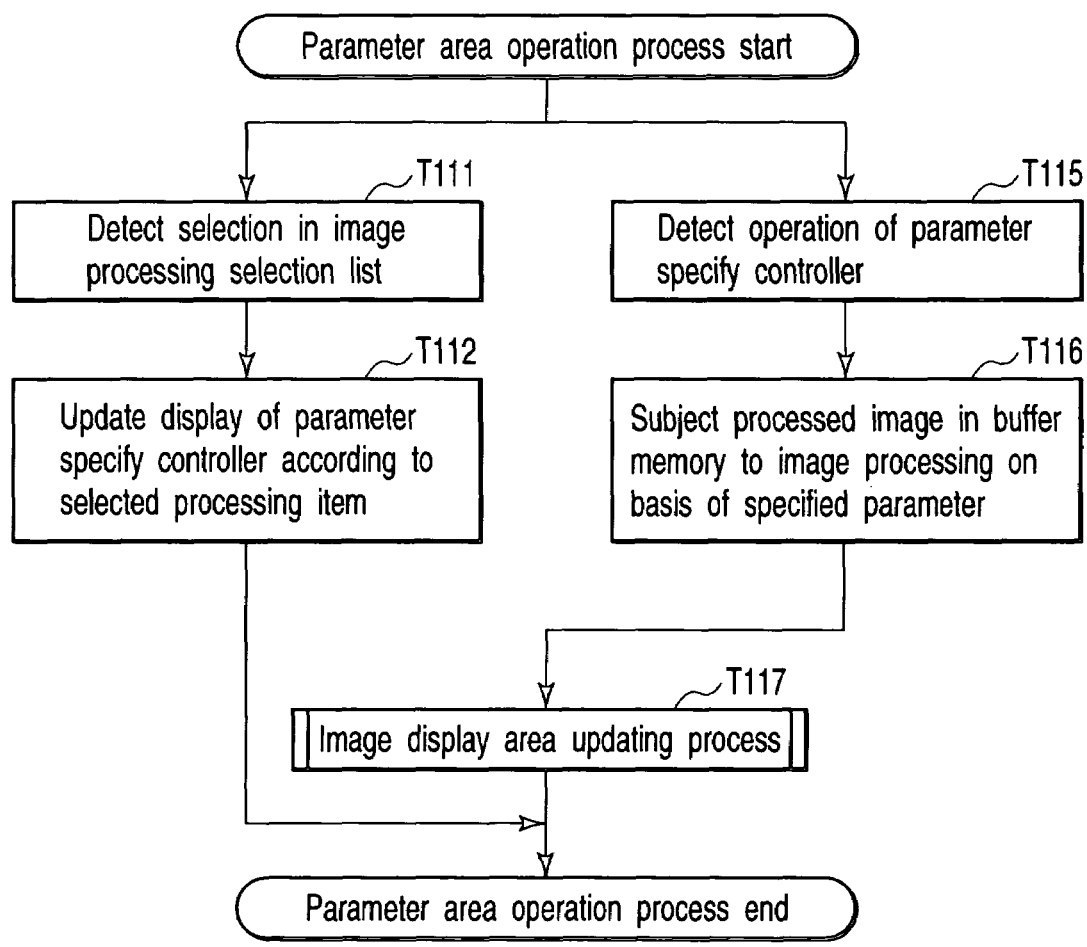
FIG. 24 is a flowchart to help explain a parameter specify area operation process.

In step T111 and step T112 of FIG. 24, if the selection of the image processing selection list 128 is detected, the parameter specify controller 129 corresponding to the selected image processing item is added to the parameter area 106.

In step T115 and step T116 of FIG. 24, if the operation of the parameter specify controller 129 is detected, the process image in the buffer memory 39 is subjected to image processing on the basis of the specified parameter. Then, an image display area updating process (FIG. 21) in step T117 is carried out, thereby updating the contents displayed in the image display area 103. Since the image display area updating process has been explained, its detailed explanation will be omitted.

After the parameter area operation process is completed, control returns to FIG. 18 and the user's next operation is waited for.

In FIG. 18, when the user performs operations related to image display, an image display area operation process (FIG. 25) in step S105 is carried out.

Figure 25:
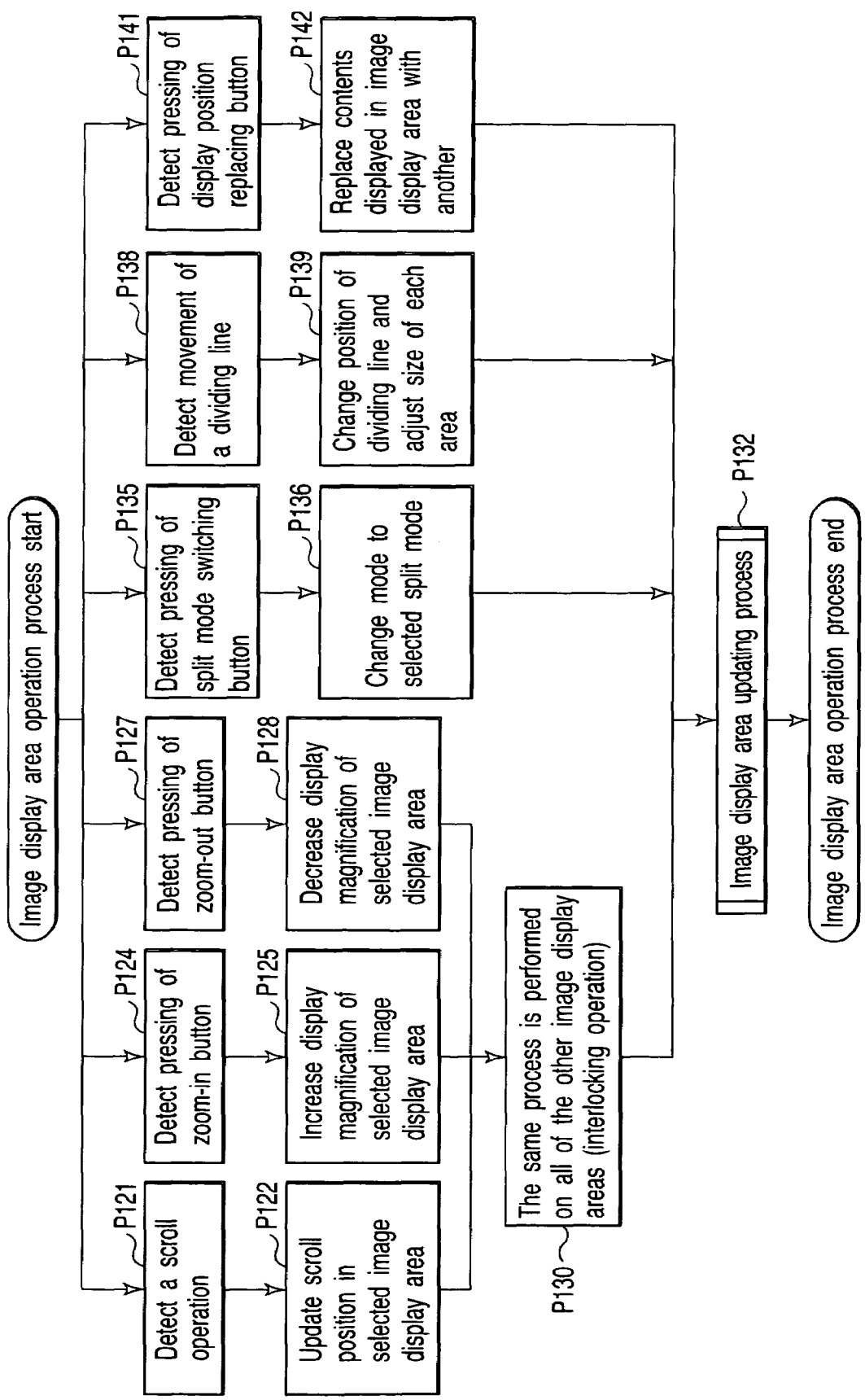
FIG. 25 is a flowchart to help explain the procedure for an image display area operation process.

When the user operates the scroll bar in the image display area 103, the display in the processed image display area 119 presently selected is changed according to the scrolling operation in step P121 and step P122 of FIG. 25. Then, in step P130, interlocking with this operation, the same process is performed on all of the other image display areas, that is, the original image display area 118 and the other processed image display areas 119. Then, in step P132, an image display area updating process (FIG. 21) is carried out, thereby updating the contents displayed in the image display area 103. Since the image display area updating process has been explained, its detailed explanation will be omitted.

When the user operates the zoom-in button 126*b*, the display magnification of the processed image display area 119 presently selected is increased in step P124 and step P125 of FIG. 25. Then, in step P130, interlocking with this operation, the same process is performed on all of the other image display areas, that is, the original image display area 118 and the other processed image display areas 119. Then, in step P132, an image display area updating process (FIG. 21) is carried out, thereby updating the contents displayed in the image display area 103. Since the image display area updating process has been explained, its detailed explanation will be omitted.

When the user operates the zoom-out button 126*a*, the display magnification of the processed image display area 119 presently selected is decreased in step P127 and step P128 of FIG. 25. Then, in step P130, interlocking with this operation, the same process is performed on all of the other image display areas, that is, the original image display area 118 and the other processed image display areas 119. Then, in step P132, an image display area updating process (FIG. 21) is carried out, thereby updating the contents displayed in the image display area 103. Since the image display area updating process has been explained, its detailed explanation will be omitted.

When the user operates the split mode buttons 127, the mode is switched to the selected split mode (vertical two-way split, horizontal two-way split, or four-way split) in step P135 to P136 of FIG. 25. In step P132, an image display area updating process (FIG. 21) is carried out, thereby updating the contents displayed in the image display area 103. Since the image display area updating process has been explained, its detailed explanation will be omitted.

When the user slides and moves the position of the dividing line 117, the position of the dividing line is changed and the size of each display area is adjusted in step P138 and step P139 of FIG. 25. Then, in step P132, an image display area updating process (FIG. 21) is carried out, thereby updating the contents displayed in the image display area 103. Since the image display area updating process has been explained, its detailed explanation will be omitted.

When the user operates the replace button 124, the processed image display area 119 to be subjected to image processing is replaced with another in step P141 and step P142 of FIG. 25. Then, in step P132, an image display area updating process (FIG. 21) is carried out, thereby updating the contents displayed in the image display area 103. Since the image display area updating process has been explained, its detailed explanation will be omitted.

After the image display area operation process is completed, control returns to FIG. 18 and the user's next operation is waited for.

In FIG. 18, when the user performs operations related to temporary storage, a temporary memory area operation process (FIG. 26) in step S106 is carried out.

Figure 26:
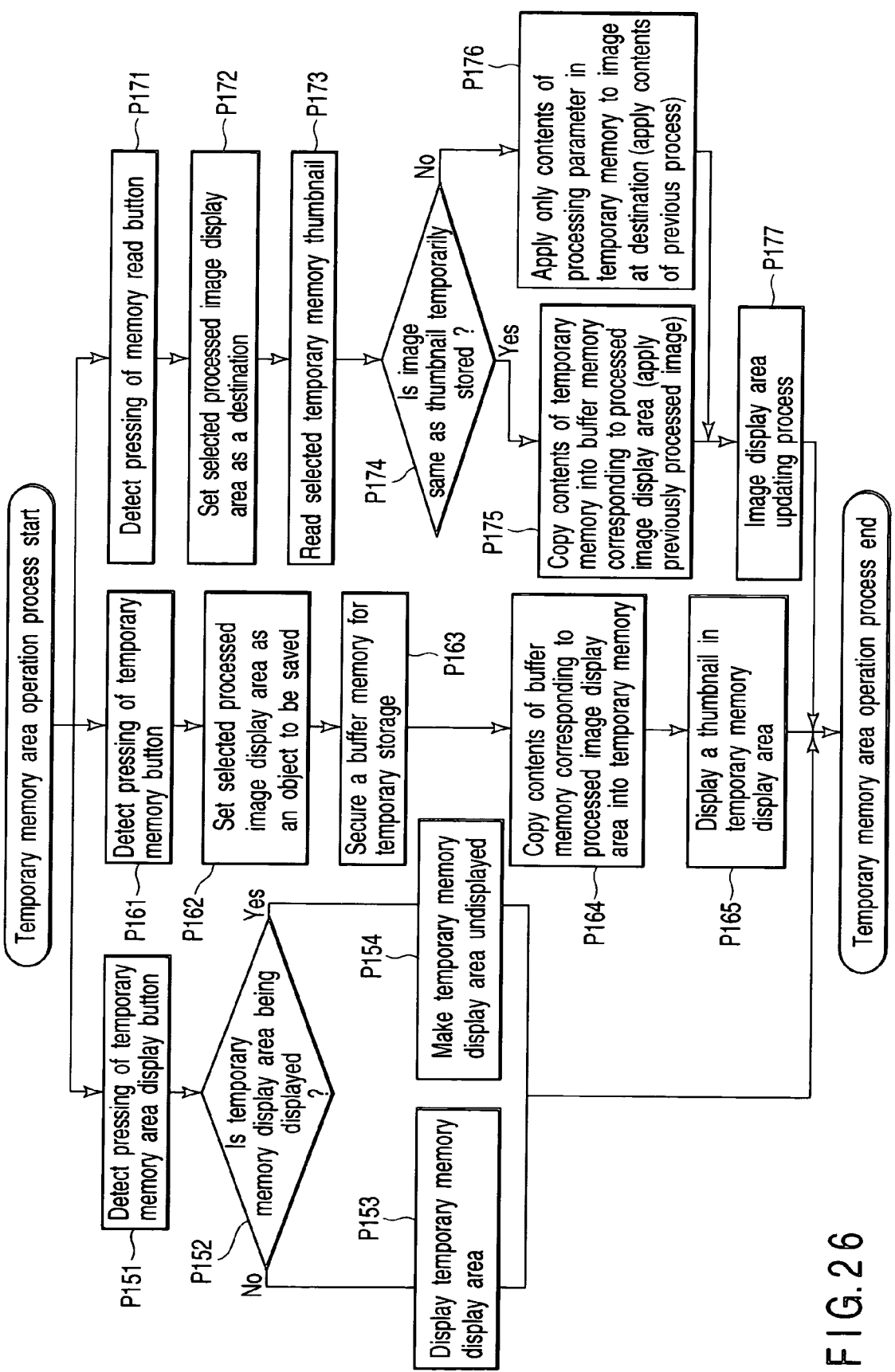
FIG. 26 is a flowchart to help explain the procedure for a temporary memory area operation process.

When the user operates the temporary memory area display button 121, it is determined in step P151 and step P152 of FIG. 26 whether the temporary memory display area 105 is being displayed. If NO in step P152, that is, if the temporary memory display area 105 is not being displayed, the temporary memory display area 105 is displayed. Furthermore, if an image has been stored in the temporary memory 38, a thumbnail of the image is displayed. If YES in step P152, that is, if the temporary memory display area 105 is being displayed, the temporary memory display area 105 is made undisplayed in step P154.

When the user operates the temporary memory button 122, the image displayed in the processed image display area 119 selected is set as an object to be stored and a memory area for temporary storage is secured in the temporary memory 38 in step P161 to P163 of FIG. 26. Then, in step P164 and step P165, the contents of the buffer memory 39 corresponding to the processed image display area 119 are copied into the temporary memory 38. At the same time, thumbnails of the contents are displayed in the temporary memory display area 105.

When the user selects one of the thumbnails displayed in the temporary memory display area 105 and operates the memory read button 123, the selected thumbnail is read and the image is written into the processed image display area 119 selected in step P171 to step P173 of FIG. 26. Next, in step 174, it is determined on the basis of original image identifying information shown in FIG. 16 whether the image displayed in the image display area 103 is the same as the thumbnail displayed in the temporary memory display area 105.

If YES in step P174, that is, if the image is the same as the thumbnail, the image in the temporary memory 38 is copied into the buffer memory 39 corresponding to the processed image display area 119. That is, the processed image stored in the temporary memory 38 is displayed in the processed image display area 119. If NO in step P174, that is, the image differs from the thumbnail, the image in the buffer memory 39 corresponding to the processed image display area 119 is subjected to image processing on the basis of the processing parameter in the temporary memory 38. Then, in step P177, an image display area updating process (FIG. 21) is carried out, thereby updating the contents displayed in the image display area 103. Since the image display area updating process has been explained, its detailed explanation will be omitted.

After the temporary memory operation process is completed, control returns to FIG. 18 and the user's next operation is waited for.

In FIG. 18, when the user operates End button 115, the end operation is detected in step S107 and the image processing screen 101 is closed.

With the above-described embodiment, a part of the image subjected to image processing and the original image are combined and the resulting image is displayed. A partial area of the image can be changed arbitrarily by moving the position of the dividing line 117 by a slide operation. Therefore, the original image and the processed image can be compared with each other flexibly on a single screen.

In addition, the original image and the image to which an image processing parameter has been applied can be arranged side by side and parameters can be set, while the results of editing are being compared in real time. Therefore, the operability of image processing is improved.

Since the zoom buttons 126a, 126b are provided, the entire image can be reduced and enlarged. This enables the result of image processing to be checked minutely and a wide area to be understood easily as an object to be processed.

When the user presses the temporary memory button 122, the image displayed in the processed image display area 119 presently selected, its processing parameter, and information identifying the original image are stored in the temporary memory. In addition, when the user selects one of the thumbnails displayed in the temporary memory display area 105 and operates the memory read button 123, the image processed using the processing parameter applied to the selected thumbnail is displayed in the processed image display area 119. Therefore, the image can be restored easily to the state stored in the temporary memory.

As described above, with the second embodiment, image processing can be done with sufficient accuracy and the user interface function for image processing can be enhanced.

Each function explained in the above embodiments may be configured in hardware. Alternatively, a program in which each function has been written in software may be loaded into a computer, thereby realizing the function. Moreover, each function may be selectively configured in software or hardware according to the situation.

Furthermore, each function may be realized by causing a program stored in a recording medium (not shown) to be loaded into a computer. The recording medium in the embodiments may use any recording system, as long as a program can be recorded into the medium and a computer can read the medium.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing method used in an image processing apparatus which includes processing means for processing an image and a display for displaying an image, the image processing method comprising:

Using a computer to perform the following steps of:
specifying an original image to be processed;
displaying a first display image corresponding to the specified original image on an image display area of the display;
setting at least one movable or transformable viewer area on the image display area;
creating a second display image corresponding to each of the viewer areas by copying a whole of the original image;
selecting one of the viewer areas and
specifying image processing to be performed on the selected viewer area;
performing the specified image processing on the whole of the second display image corresponding to the selected viewer area;
replacing the selected viewer area with the second display image after the corresponding image processing; and
according to the movement or transformation of the selected viewer area, the result of the image processing is displayed in the selected viewer area and the image before image processing is displayed in the remaining area of the image display area.

2. The image processing method according to claim 1, further comprising:
specifying at least one boundary for setting the viewer areas,
wherein the boundary is allowed to move freely according to the operation of the user of the image processing apparatus in the image display area.

3. The image processing method according to claim 2, wherein the boundary is composed of a straight line and separates the viewer area from the first display image.

4. The image processing method according to claim 1, wherein at least one of the viewer areas is surrounded by a closed boundary, and each viewer area surrounded by the closed boundary is allowed to move freely according to the operation of the user of the image processing apparatus in the image display area.

5. The image processing method according to claim 4, said each closed boundary is composed with a plurality of line segments.

6. The image processing method according to claim 1, wherein the image processing specified for a first viewer area and one for a second viewer area are allowed to exchange with each other, including a case where either the first or the second viewer areas is not processed.

7. The image processing method according to claim 1, further comprising:
acquiring at least one image processing parameter for the image processing according to the operation of the user of the, image processing apparatus.

8. The image processing method according to claim 4, further comprising:
ranking the viewer areas,
wherein, when a first viewer area overlaps with a second viewer area, the overlapping partial area of the first and the second viewer area is subjected to the image processing performed on the first and second viewer areas in the order in which the viewer areas have been ranked and the resulting image is displayed in the partial area.

9. The image processing method according to claim 8, further comprising:
changing the order in which the viewer areas are ranked.

10. The image processing method according to claim 1, further comprising:
selecting one of the viewer areas on the display; and
subjecting the original image to the same image processing as that performed on the selected viewer area and storing the resulting image.

11. The image processing method according to claim 8, further comprising:
selecting one of the viewer areas or one of the partial areas; and
subjecting the original image to the same image processing as that performed on the selected viewer area or the partial area and storing the resulting image.

12. The image processing apparatus according to claim 11, wherein the viewer area setting section specifies at least one boundary for setting the viewer areas, wherein
the boundary is allowed to move freely according to the operation of the user of the image processing apparatus in the image display area.

13. The image processing apparatus according to claim 12, wherein the boundary is composed of a straight line and separates the viewer area from the first display image.

14. An image processing apparatus comprising:
a display which displays an image;
an image specifying section which specifies an original image to be processed;
an image display section which displays on an image display area of the display, a first display image of the original image specified by the image specifying section;
a viewer area setting section which sets at least one movable or transformable viewer area on the image display area;
a second display image creating section which creates a second display image corresponding to each of the viewer areas by copying a whole of the original image;
a viewer area selecting section which selects one of the viewer areas;
an image processing specifying section which specifies image processing to be performed on the selected viewer area;
an image processing section which performs the specified image processing on the whole of the second display image corresponding to the selected viewer area;
a display updating section which replaces the selected viewer area with the second display image after the corresponding image processing and
according to the movement or transformation of the selected viewer area, the result of the image processing is displayed in the selected viewer area and the image before image processing at the image processing section is displayed in the remaining area of the image display area.

15. The image processing apparatus according to claim 14, wherein at least one of the viewer areas is surrounded by a closed boundary, and each viewer area surrounded by the closed boundary is allowed to move freely according to the operation of the user of the image processing apparatus in the image display area.

16. The image processing apparatus according to claim 15, said each closed boundary is composed with a plurality of line segments.

17. The image processing apparatus according to claim 15, further comprising:
a ranking section which ranks the viewer areas set by the viewer area setting section, and
a partial area display section which, when a first viewer area overlaps with a second viewer area, subjects the overlapping partial area of the first and second viewer areas to the image processing performed on the first and second viewer areas in the order in which the viewer areas have been ranked and displays the resulting image in the partial area.

18. The image processing apparatus according to claim 17, further comprising:
   an order changing section which changes the order in which the viewer areas are ranked by the ranking section.

19. The image processing apparatus according to claim 17, further comprising:
   a second viewer area selecting section which selects one of the viewer areas or one of the partial areas on the display; and
   a memory section which subjects the original image to the same image processing as that performed by the image processing section on the viewer area or the partial area selected by the second viewer area selecting section, and stores the resulting image.

20. The image processing apparatus according to claim 14, further comprising an exchanging section which allows the image processing specified for a first viewer area and one for a second viewer area to be exchanged with each other, including a case where either the first or the second viewer areas are not processed.

21. The image processing apparatus according to claim 14, further comprising an acquisition section which acquires at least one image processing parameter for the image processing section to perform processing, according to the operation of the user of the image processing apparatus.

22. The image processing apparatus according to claim 14, further comprising:
   a second viewer area selecting section which selects one of the viewer areas on the display; and
   a memory section which subjects the original image to the same image processing as that performed by the image processing section on the viewer area selected by the second viewer area selecting section, and stores the resulting image.

23. A computer-readable recording medium which holds an image processing program to be executed on an image processing apparatus including processing means for processing an image and a display for displaying an image,
   wherein the image processing program causes a computer to execute the following steps:
   an image specifying step of specifying an original image to be processed;
   an image displaying step of displaying on an image display area of the display, a first display image of the original image specified in the image specifying step;
   a viewer area setting step of setting at least one movable or transformable viewer area on the image display area;
   a second display image creating step of creating a second display image corresponding to each of the viewer areas by copying a whole of the original image;
   a viewer area selecting step of selecting one of the viewer areas;
   an image processing specifying step of specifying image processing to be performed on the selected viewer area;
   an image processing step of performing the specified image processing on the whole of the second display image corresponding to the selected viewer area;
   a display updating step of replacing the selected viewer area with the second display image after the corresponding image processing in the image processing step and according to the movement or transformation of the selected viewer area, the result of the image processing is displayed in the selected viewer area and the image before image processing in the image processing step is displayed in the remaining area of the image display area.

24. The computer-readable recording medium according to claim 23, wherein the viewer area setting step is to specify at least one boundary for setting the viewer areas, wherein
   the boundary is allowed to move freely according to the operation of the user of the image processing apparatus in the image display area.

25. The computer-readable recording medium according to claim 24, wherein the boundary is composed of a straight line and separates the viewer area from the first display image.

26. The computer-readable recording medium according to claim 23, wherein at least one of the viewer areas is surrounded by a closed boundary, and each viewer area surrounded by the closed boundary is allowed to move freely according to the operation of the user of the image processing apparatus in the image display area.

27. The computer readable recording medium according to claim 26, said each closed boundary is composed with a plurality of line segments.

28. The computer-readable recording medium according to claim 26, wherein the program further comprises:
   a ranking step of ranking the viewer areas set by the viewer area setting step, and
   a partial area displaying step of, when a first viewer area overlaps with a second viewer area, subjecting the overlapping partial area of the first and second viewer areas to the image processing performed on the first and second viewer areas in the order in which the viewer areas have been ranked in the ranking step and displaying the resulting image in the partial area.

29. The computer-readable recording medium according to claim 28, wherein the program further comprises an order changing step of changing the order in which the viewer areas are ranked in the ranking step.

30. The computer-readable recording medium according to claim 28, wherein the program further comprises:
   a second viewer area selecting step of selecting one of the viewer areas or one of the partial areas on the display; and
   a memory storage step of subjecting the original image to the same image processing as that performed in the image processing step on the viewer area or the partial area selected in the second viewer area selecting step, and storing the resulting image.

31. The computer readable recording medium according to claim 23, wherein the program further comprises an exchanging step of allowing the image processing specified for a first viewer area and one for a second viewer area to be exchanged with each other, including a case where either the first or the second viewer areas are not processed.

32. The computer-readable recording medium according to claim 23, wherein the program further comprises an acquiring step of acquiring at least one image processing parameter for processing in the image processing step, according to the operation of the user of the image processing apparatus.

33. The computer-readable recording medium according to claim 23, further comprising:
   a second viewer area selecting step which selects one of the viewer areas on the display; and
   a memory storage step which subjects the original image to the same image processing as that performed by the image processing step on the viewer area selected in the second viewer area selecting step, and storing the resulting image.

* * * * *